Figure 1:
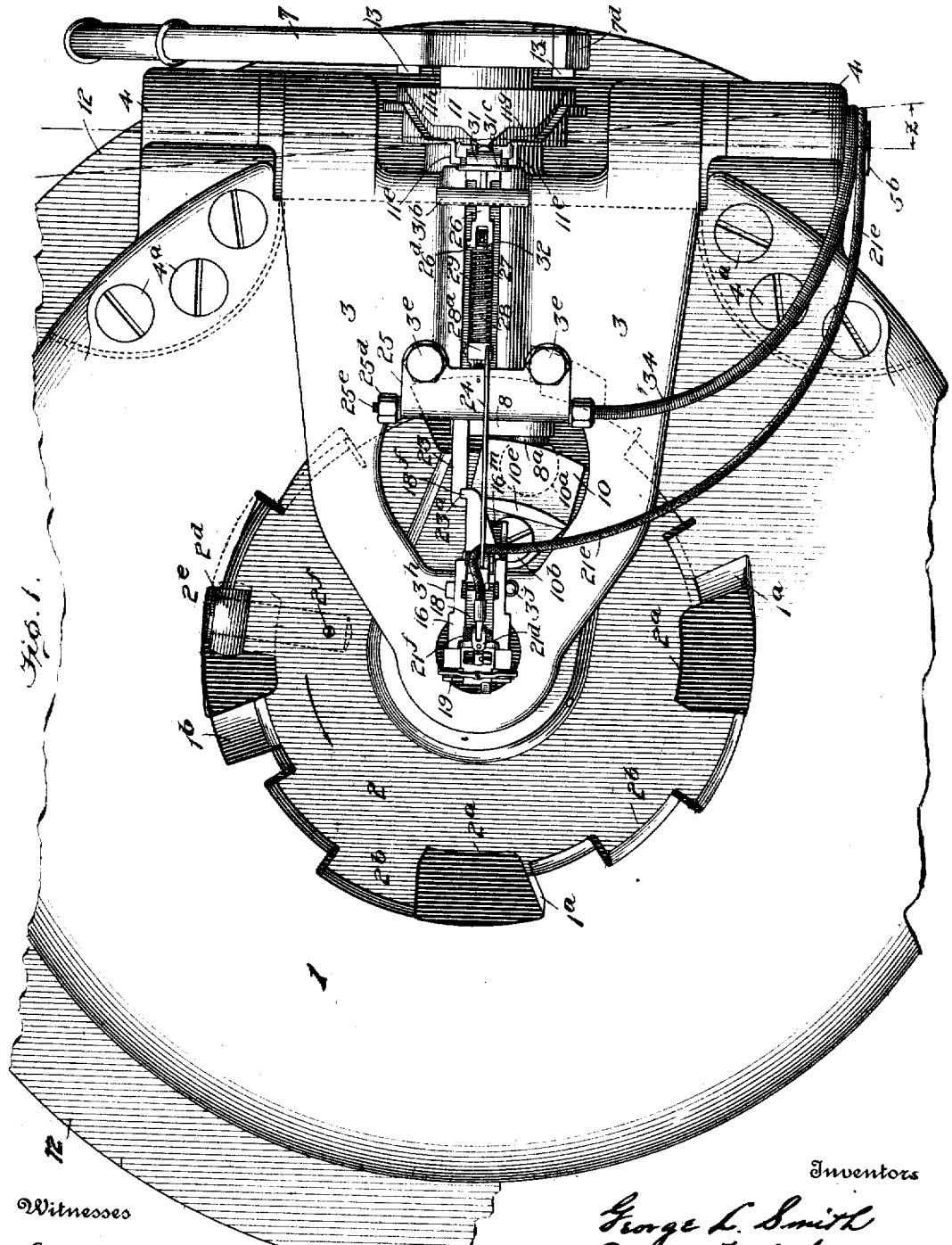

G. L. SMITH & D. F. ASBURY.
BREECH MECHANISM FOR ORDNANCE.
APPLICATION FILED MAY 31, 1911.

1,020,849.

Patented Mar. 19, 1912.

12 SHEETS—SHEET 2.

Witnesses
Edwin L. Bradford
Wm E Dyre

Inventors
George L. Smith
Dorsey F. Asbury
By Ritter & Ritter
Their Attorneys

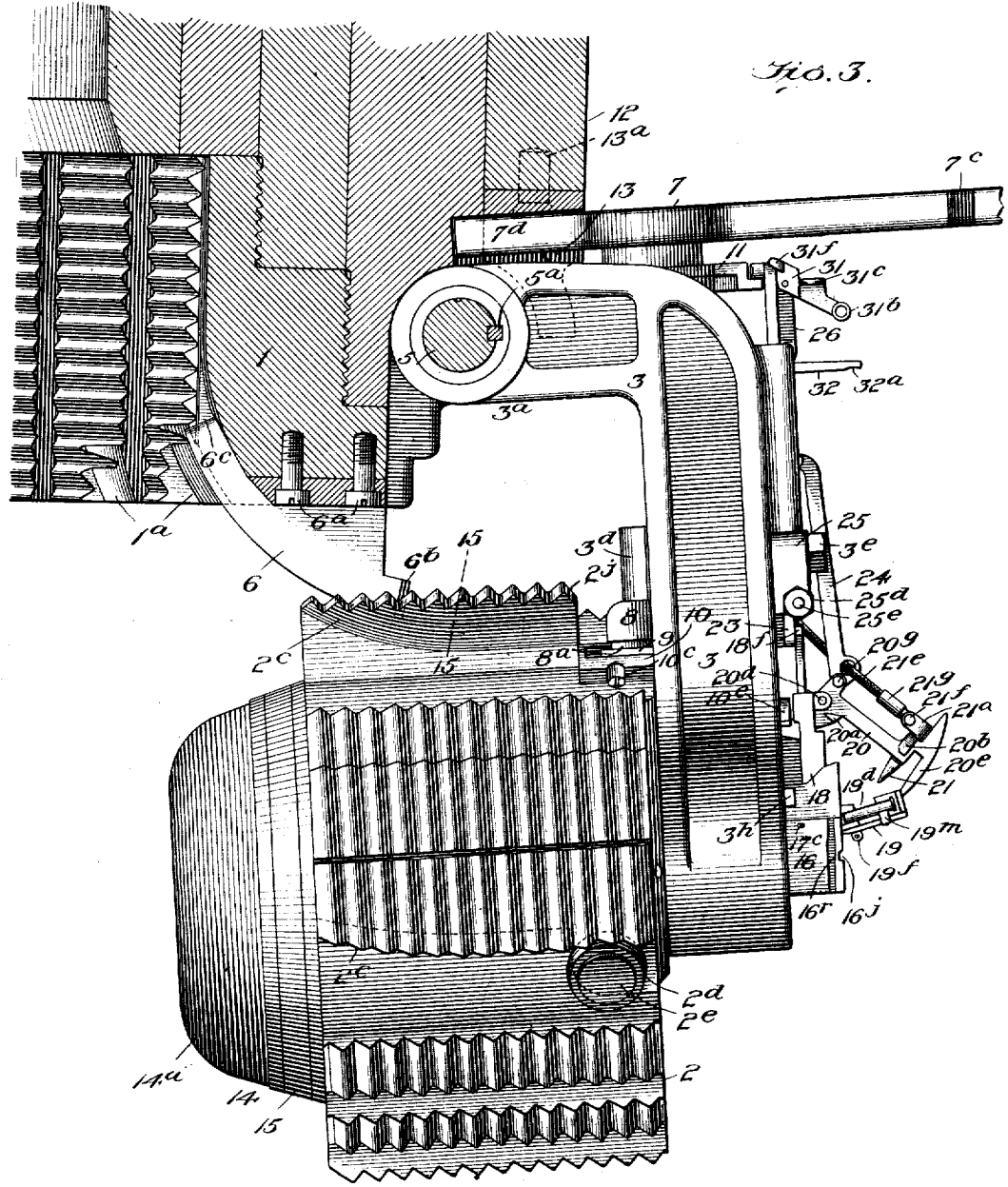

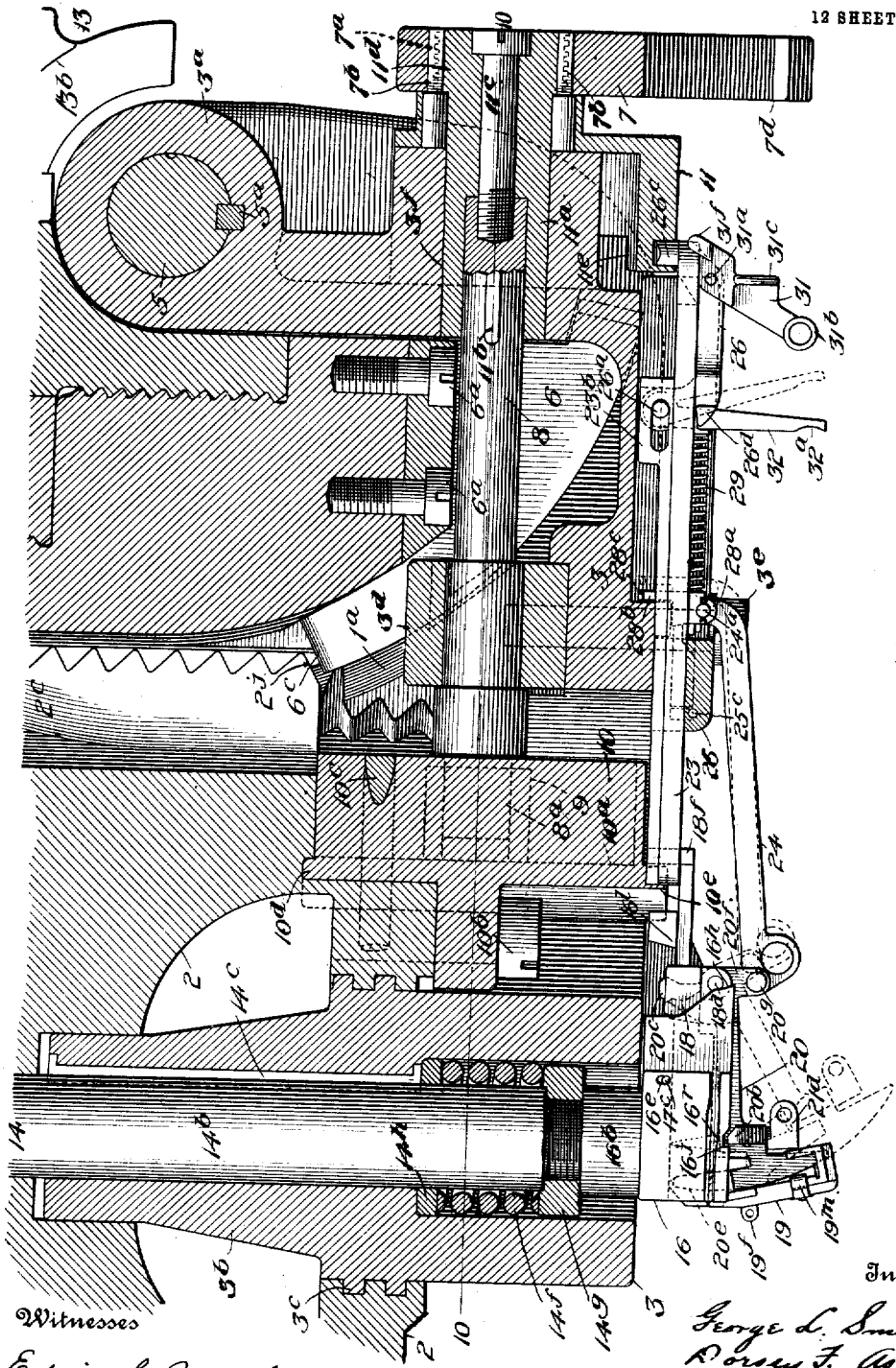

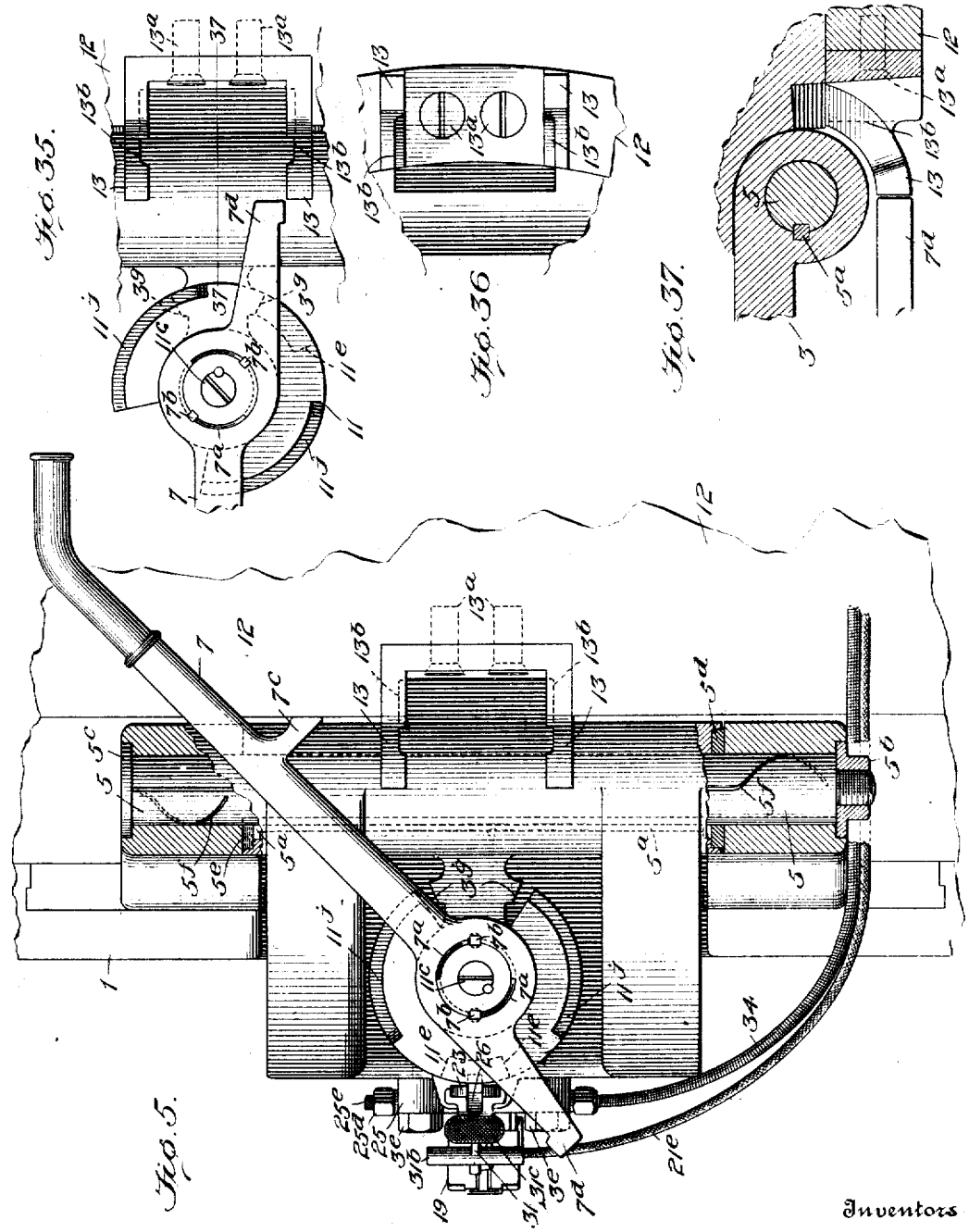

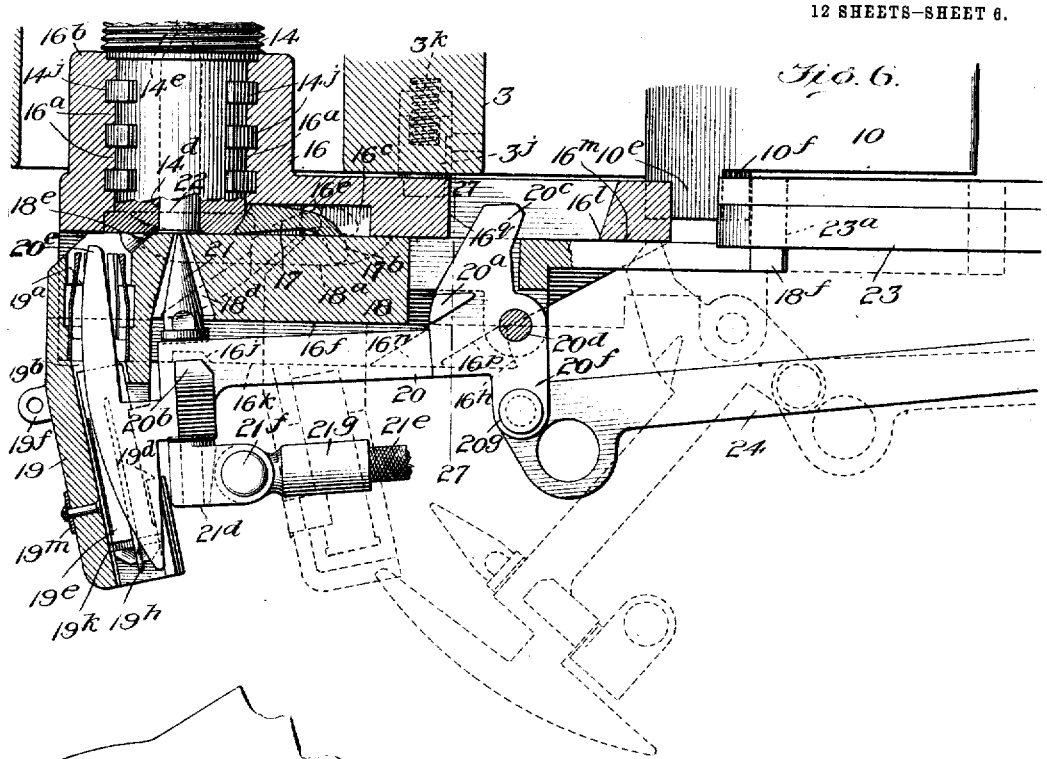
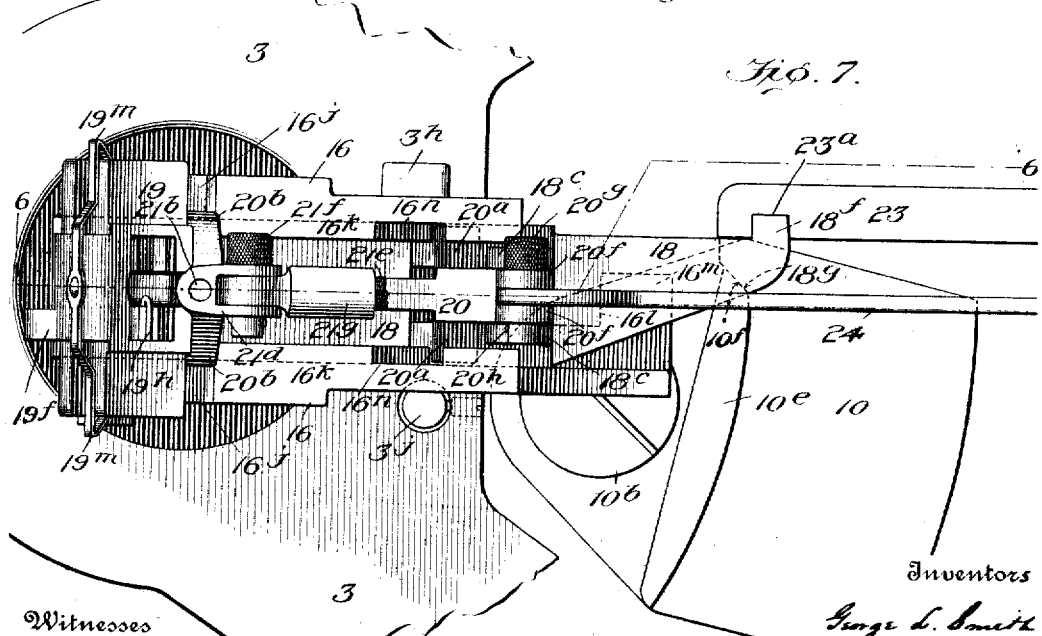

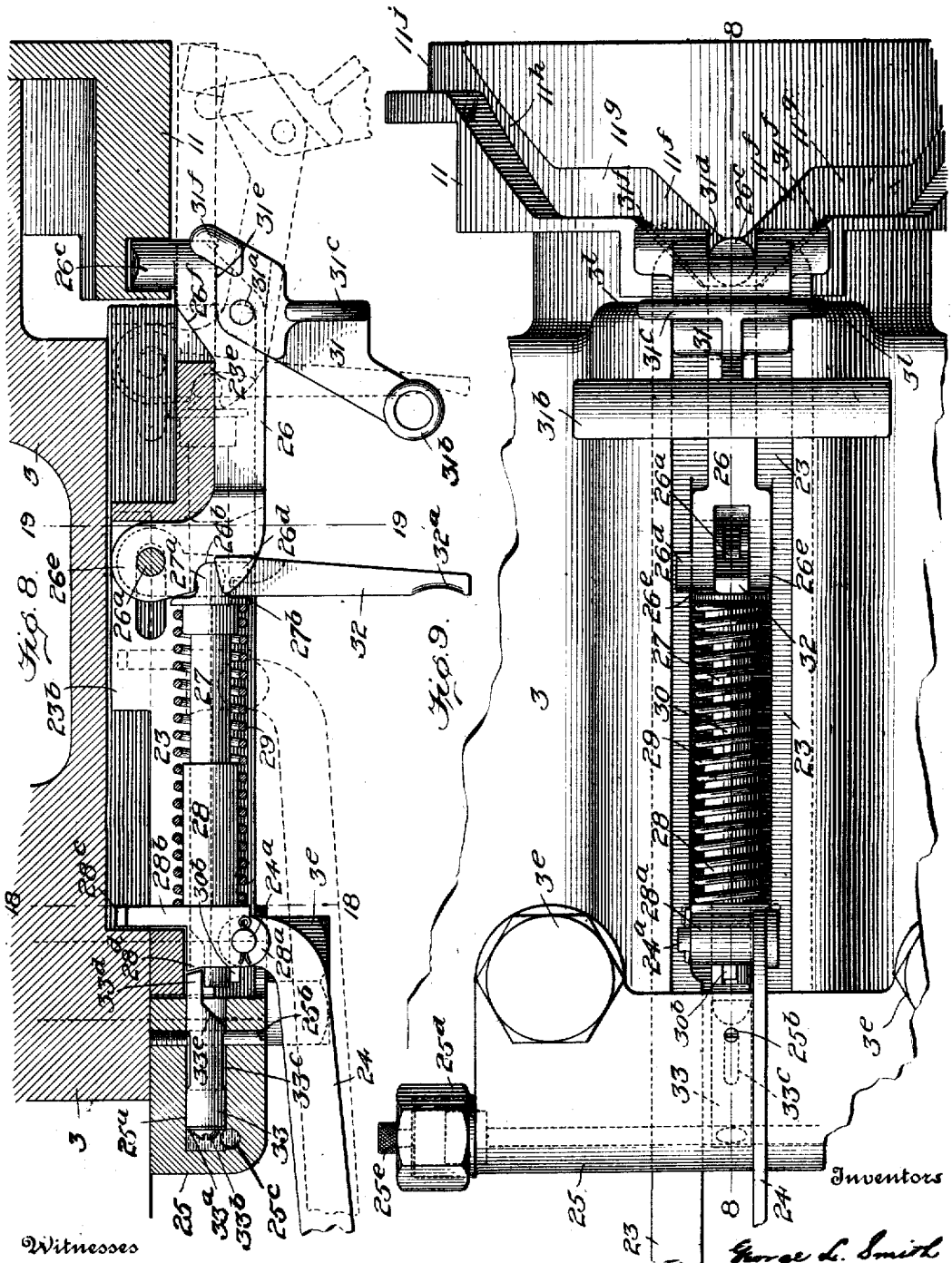

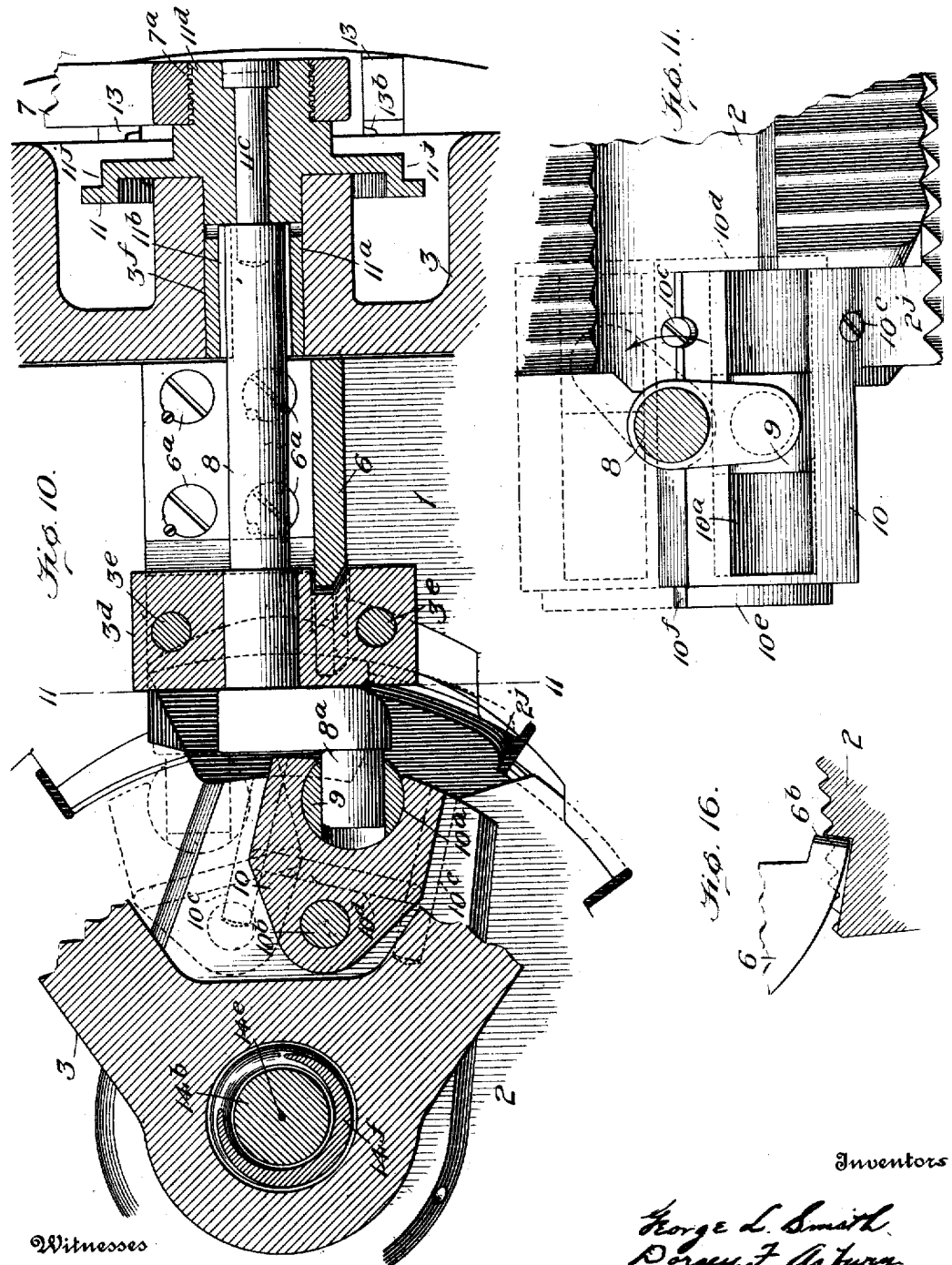

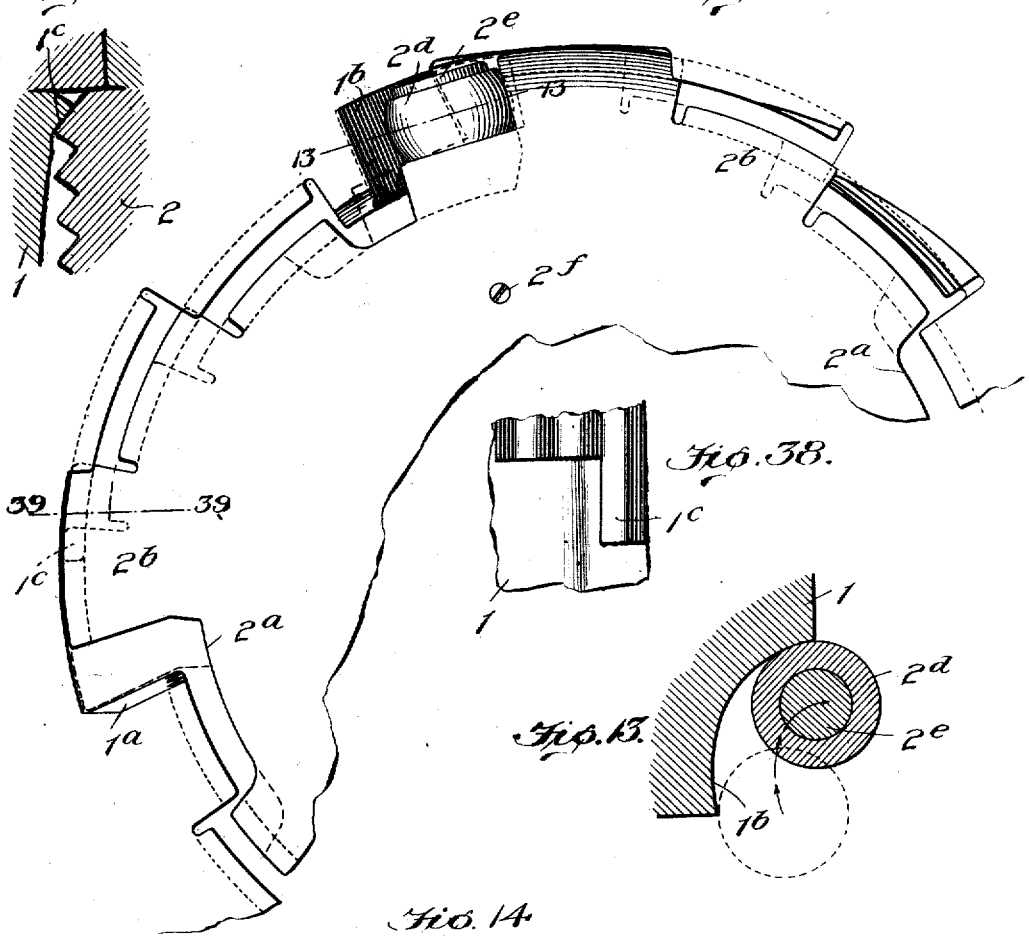

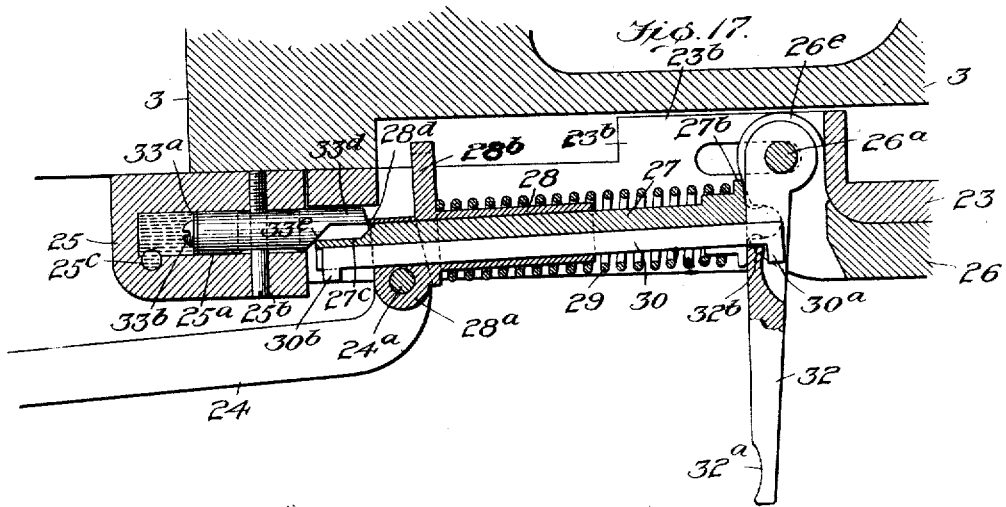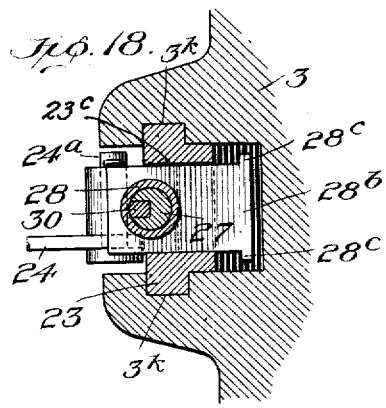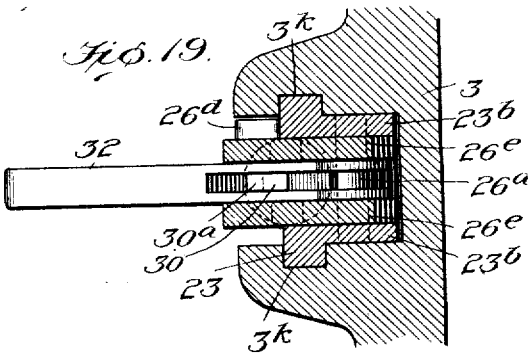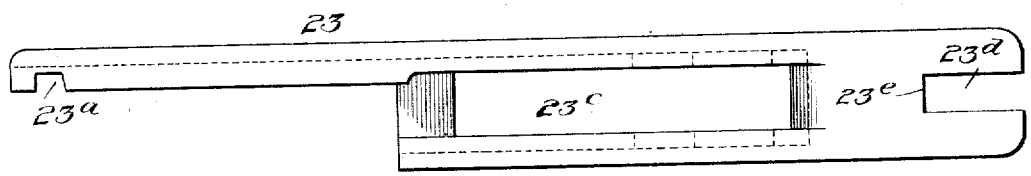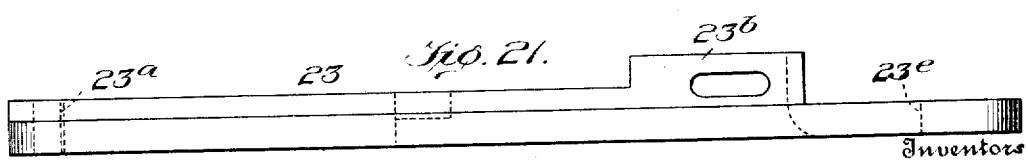

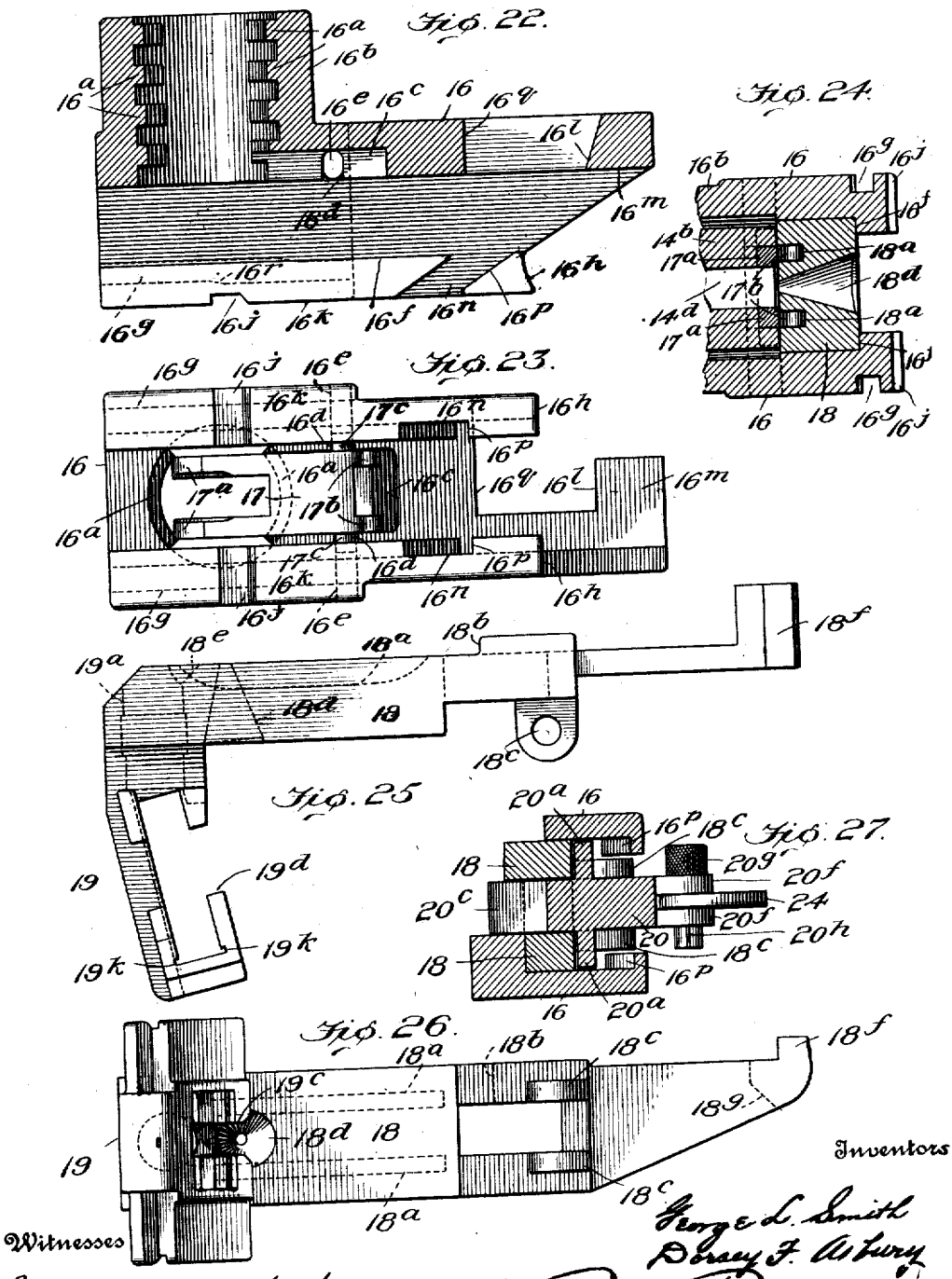

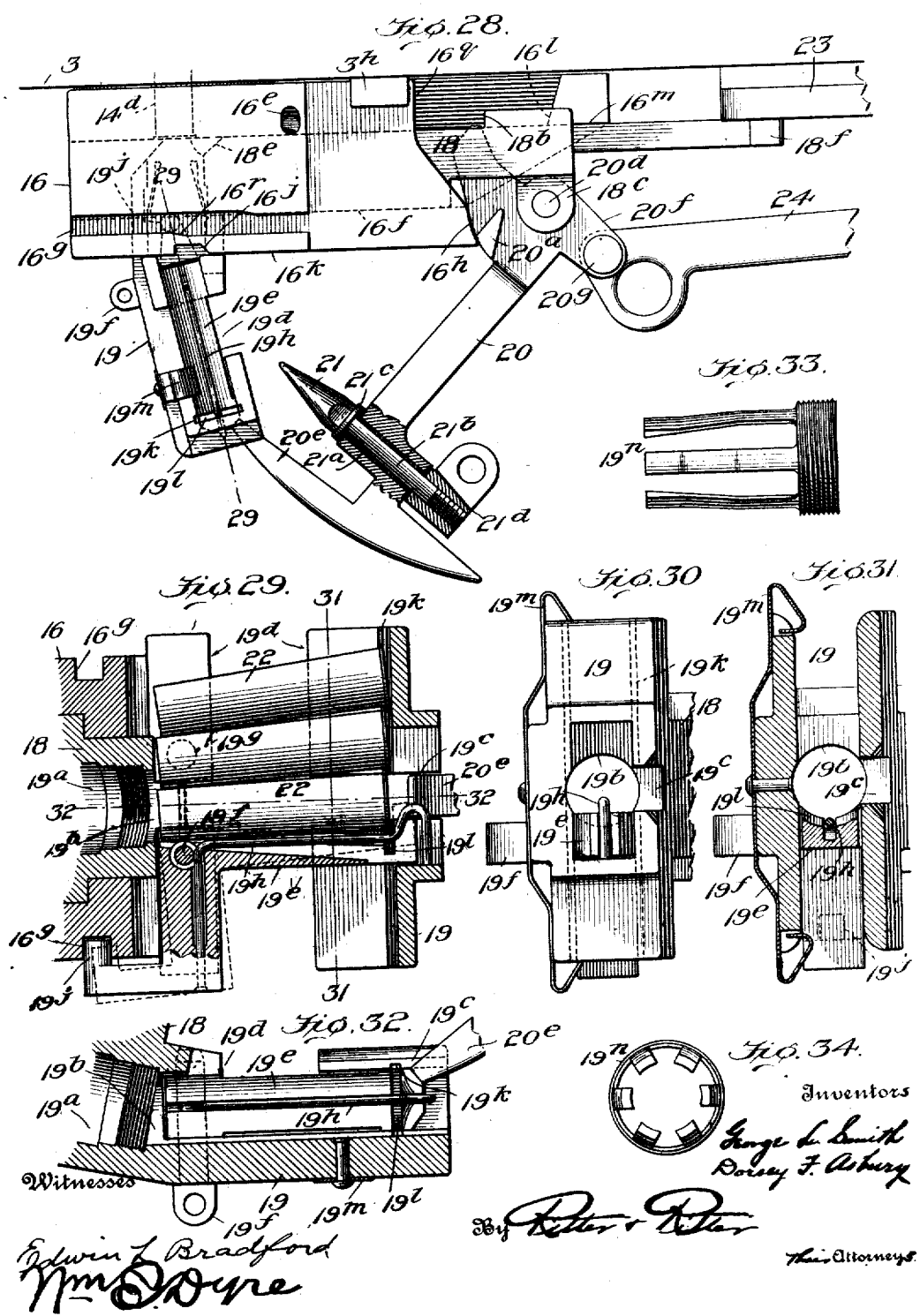

UNITED STATES PATENT OFFICE.

GEORGE L. SMITH AND DORSEY F. ASBURY, OF WASHINGTON, DISTRICT OF COLUMBIA.

BREECH MECHANISM FOR ORDNANCE.

1,026,849.

Specification of Letters Patent. Patented Mar. 19, 1912.

Application filed May 31, 1911. Serial No. 630,351.

*To all whom it may concern:*

Be it known that we, GEORGE L. SMITH and DORSEY F. ASBURY, citizens of the United States, residing at Washington, District of Columbia, have invented certain new and useful Improvements in Breech Mechanism for Ordnance; and we do hereby declare the following to be a full, clear, and exact description of the invention, such as will enable others skilled in the art to which it appertains to make and use the same.

Our invention relates to the construction of breech mechanism for guns, and is particularly designed to afford a simple, durable and efficient mechanism of this character for guns using ammunition which is too heavy or cumbersome to be loaded automatically.

The principal objects of the invention are to obtain rapidity of operation; to reduce loss of power due to overcoming the weight, inertia and friction of moving parts; to provide a mechanism which will make it unnecessary for the operator to at any time stand in the path of the recoil of the gun; to simplify and reduce the number of parts and to make each part of such a form as to be suitable for either right or left handed mounts; to utilize the energy stored up in the mechanism while swinging it into the breech to initiate a locking rotation of the plug upon its axis, thus eliminating the slamming action of the plug after it has entered the gun breech and before it starts to rotate, and consequently increasing the rapidity with which it is possible to operate the mechanism and also relieving both the gun and operator from unnecessary strain; to provide means for securely locking the plug against rotation when the gun is fired without the use of so-called plug and carrier latches, which, as is well known, are more or less susceptible to derangement; to provide simple and effective means whereby the operator may easily control the plug as it swings out of the breech end of the gun notwithstanding that the ship upon which it may be mounted may be rolling or pitching heavily; to avoid the use of gear wheels in applying power; to reduce as far as possible the clearance cuts in the threads of the plug and screw box necessary to permit the plug to swing upon its hinge; to provide a magazine firing lock which operates to place the primer after the breech is closed and almost completely locked and which may be operated from the side of the gun where the operator is clear of the recoil, thus permitting the rapid ejection of a primer which has failed and the insertion of another primer in order that a further attempt to fire the gun may be quickly made; to provide for the automatic loading of primers; to prevent the wedge of the lock from crushing the primer in case the primer jams in loading; and to provide for exploding the primer not only electrically but by percussion when the operator is at a distant point as well as when he occupies a position at the side of the breech mechanism.

Generally stated, the breech mechanism by which the before noted objects of our invention are accomplished is of the carrier type and comprises a hinged carrier upon which is rotatably mounted a breech plug that is provided with interrupted threads and is rotated axially by means of a crank which is also mounted on the carrier and which is operated through the instrumentality of a lever that additionally serves as a means for swinging the carrier upon its hinge pin, there being likewise mounted upon the carrier a magazine firing lock which may be operated from the side of the gun and which is so related to the other parts of the mechanism that the primer is not loaded until the breech plug is substantially in locked position, the said crank and breech plug being operatively so combined that the former effectively resists any tendency of the plug to perform an unlocking rotation such as might result from internal pressures when the gun is fired, and the breech plug and a portion of the gun adjacent thereto being provided with coöperating cam devices whereby the plug is caused to rotate upon its axis through a small angle as it swings about the hinge pin of the carrier when in proximity to and approaching or receding from its closed position; and such a construction embodies the principal features of our invention.

Figure 2:
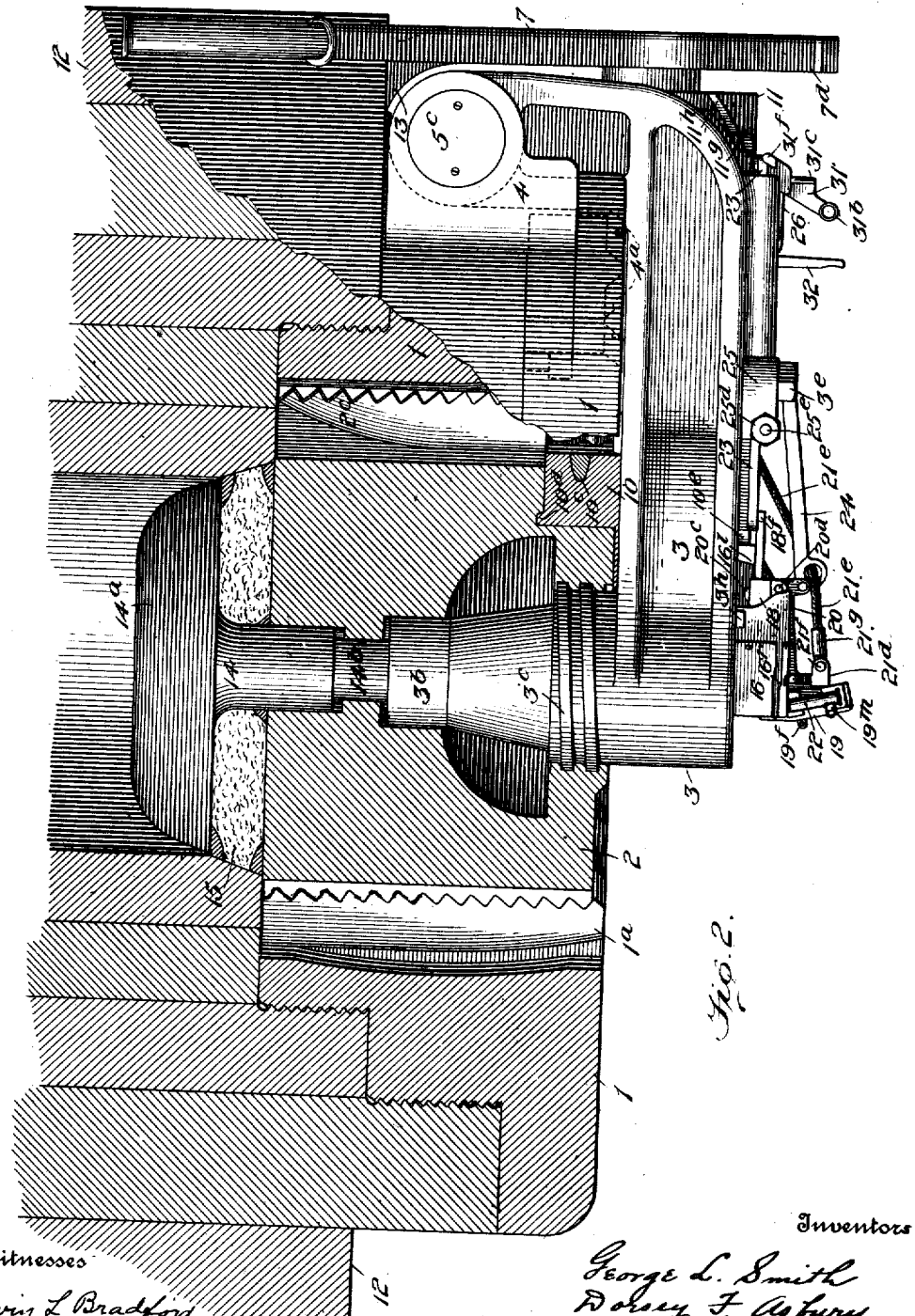

In the drawings chosen for the purpose of illustrating our invention, the scope whereof is pointed out in the claims, Figure 1 is an end elevation of a gun provided with breech mechanism constructed in accordance with our invention, the parts being shown in the positions they occupy when the gun is ready to fire; Fig. 2 is a view, partly in plan and partly in horizontal central section, of the breech mechanism illustrated in Fig. 1, the parts being shown in the relative positions they occupy when the gun is ready to fire; Fig. 3 is a view, partly in plan and partly in horizontal central section, showing the breech mechanism when swung open ready for loading; Fig. 4 is a detail view, partly in plan and partly in horizontal central section, showing the breech plug operating devices and the magazine firing lock, the parts being shown in full lines in the positions they occupy when the gun is ready to fire, and the cocked position of the hammer, firing pin, firing trigger and connecting parts being shown in dotted lines; Fig. 5 is a view of the breech mechanism, partly in side elevation and partly in vertical section, the parts being in the positions illustrated in Figs. 1, 2 and 4; Fig. 6 is a detail view, partly in plan and partly in horizontal section on the line 6—6, Fig. 7, showing the magazine firing lock, the positions which the parts occupy when the gun is ready to fire being illustrated in full lines and the positions assumed by the parts when the breech is swung open being shown in dotted lines; Fig. 7 is a detail elevation of the portion of the mechanism illustrated in Fig. 6; Fig. 8 is a detail view, partly in plan and partly in horizontal section on the line 8—8, Fig. 9, showing the magazine firing lock operating mechanism, the positions which the parts occupy when in the ready to fire position being shown in full lines and the positions assumed by the parts when the operator handle is actuated to eject a primer which has failed being shown in dotted lines; Fig. 9 is a detail elevation of the parts illustrated in Fig. 8; Fig. 10 is a detail view taken in the plane of the line 10—10, Fig. 4, the crank by which the breech plug is rotated being shown in elevation, the relation of the operating parts to the breech plug when the latter is in locked position being shown in full lines and the positions assumed by the parts when the plug is rotated to unlocked position being illustrated in dotted lines; Fig. 11 is a detail view taken in the plane of the line 11—11, Fig. 10, showing in full lines the relative positions of the parts when the breech plug is in locked position and showing in dotted lines the positions which these parts occupy when the plug has been rotated to unlocked position; Fig. 12 is a detail elevation of the threaded breech plug and screw box, together with the cam devices by which the former is rotated upon its axis to prevent slamming, the relation of the plug and screw box when the plug has completed its unlocking axial rotation being illustrated in dotted lines and the relation of the plug and screw box at the beginning of the engagement of their threads being illustrated in full lines; Fig. 13 is a detail section of the cam devices taken in the plane of the line 13—13, Fig. 12, the dotted position of the cam roller corresponding to the dotted position of the breech plug in Fig. 12; Fig. 14 is a detail elevation of the portion of the breech plug which coöperates with the control arc; Fig. 15 is a detail view taken in the plane of the line 15—15, Fig. 3, showing the relation of the breech plug and control arc; Fig. 16 is a detail view, partly in plan and partly in horizontal section, showing the relation of the control arc and breech plug when the latter is latched or locked in open position; Fig. 17 is a detail view, partly in plan and partly in horizontal section showing the fluid pressure actuated devices for cocking the firing mechanism and releasing the main spring thereof; Fig. 18 is a detail sectional view, taken in the plane of the line 18—18, Fig. 8; Fig. 19 is a detail sectional view, taken in the plane of the line 19—19, Fig. 8; Fig. 20 is a detail front elevation of the operator bar of the firing mechanism; Fig. 21 is a detail plan view of the operator bar of the firing mechanism; Fig. 22 is a detail horizontal central section of the receiver member of the firing mechanism; Fig. 23 is a detail elevation of a portion of the firing mechanism, showing the relation of the receiver and primer extractor; Fig. 24 is a detail vertical section of the receiver, lock wedge, primer extractor and the end of the mushroom stem, the parts being shown in the position illustrated in full lines in Fig. 6; Fig. 25 is a detail plan view of the magazine and wedge; Fig. 26 is a detail elevation of the devices illustrated in Fig. 25; Fig. 27 is a detail vertical section, taken in the plane of the line 27—27, Fig. 6, showing the relation of the hammer to the wedge and receiver of the firing mechanism; Fig. 28 is a detail plan view of the magazine lock, showing the parts in position for feeding the primer from the magazine to the primer chamber in the end of the mushroom stem; Fig. 29 is a detail sectional view taken in the plane of the line 29—29, Fig. 28, showing the lowermost primer in the magazine unlatched and also showing the hammer unlatched and ready to force the primer into the primer chamber of the mushroom stem; Fig. 30 is a detail end elevation of the magazine; Fig. 31 is a detail sectional view of the magazine, taken in the plane of the line 31—31, Fig. 29; Fig. 32 is a detail horizontal section of the magazine, taken in the plane of the line 32—32, Fig. 29; Fig. 33 is a detail view of the resilient primer guide; Fig. 34 is an end view of the primer guide shown in Fig. 33; Fig. 35 is a detail side elevation showing the relation of the operating lever and the safety jaws when the breech plug has been rotated upon its axis to unlocked position; Fig. 36 is a detail end elevation of the safety jaws shown in Fig. 35; Fig. 37 is a detail horizontal section taken in the plane of the line 37—37, Fig. 35; Fig. 38 is a detail elevation of a portion of the screw box, showing one of the extended threads at the outer end thereof; and Fig. 39 is a detail section taken in the plane of the line 39—39, Fig. 12.

In the drawings, 1 is the screw box liner, 2 the breech plug and 3 the carrier. The screw box liner 1, which, as more particularly shown in Figs. 2, 3 and 4, is screwed into the breech end of the gun, is provided upon one side with perforated hinge lugs 4 which are adapted to receive a hinge pin 5 by means of which the carrier 3 is pivotally mounted upon the gun. These hinge lugs 4, which may be conveniently recessed into the screw box liner 1 and rigidly secured thereto by means of a screw bolt $4^a$, are preferably located close to the side of the gun so that the breech plug mounted upon the carrier 3 shall be required to swing through a short arc only and shall overhang or project outwardly from the gun but a short distance when the breech is open, the resistance which the weight, inertia and friction of parts offer to the swinging of the carrier 3 upon its hinge pin being thus reduced. In order to decrease the bearing pressure on the hinge lugs 4 said lugs, as shown, are preferably separated as widely as possible so as to afford a large supporting leverage for the carrier 3 and associated parts. As shown more particularly in Fig. 5, the hinge pin 5, which is preferably rigidly secured to the carrier 3 by means of a key $5^a$ that fits into corresponding key-ways formed in the hinge pin and carrier, may be conveniently secured in the hinge lugs 4 by means of a nut $5^b$ which has threaded engagement with the reduced lower end of the hinge pin, the upper end of said hinge pin being headed as at $5^c$. For the purpose of being readily able to compensate for wear a washer $5^d$ is preferably interposed between the lower hinge lug 4 and the carrier 3, the adjacent hinge lug of the carrier being recessed or countersunk, as shown, to receive such washer. When, as illustrated in the drawings, the parts are assembled as a right handed mechanism, the corresponding washer-receiving recess in the upper hinge lug of the carrier 3 forms an oil space $5^e$. When the gun is converted into a left handed mechanism the carrier 3 is reversed in position and the supporting washer $5^d$ is transferred to the washer-receiving recess of the other carrier hinge lug, which then becomes the lower hinge lug, as will be readily understood. If desired, the hinge pin 5 may be provided with oil grooves $5^f$.

The carrier may be conveniently fashioned as a yoke or frame member 3 which is provided at one end with a plurality of perforated hinge lugs $3^a$ that are adapted to receive the hinge pin 5, as heretofore described. The inner end of the carrier is formed with an inwardly projecting boss or hollow spindle upon which the breech plug 2 is rotatably mounted, said spindle being provided at its inner end with a cylindrical bearing portion $3^b$ which is adapted to enter a corresponding recess formed in the breech plug approximately at its center of gravity, and being also provided with threads $3^c$ which engage corresponding threads cut in the rear end of the plug and thus securely maintain the plug upon the carrier. The threads $3^c$, which are of the same pitch as the threads of the breech plug 2, permit the latter to travel forwardly into the gun in locking to thus compress the gas check pad while the carrier 3 remains at rest with respect to the screw box 1.

The breech plug 2, which is preferably of the Welin or stepped thread type, is, generally speaking, of the usual design, but the blanks $2^a$ thereof are made somewhat wider than the steps $2^b$ so that upon an unlocking rotation of the plug the threads thereon are disengaged from those in the screw box liner before the plug has rotated through the angle subtended by the blank, thus permitting the plug to swing around the hinge pin of the carrier while simultaneously rotating upon its own axis.

In the particular construction illustrated in the drawings, the breech plug 2 rotates upon its axis through an angle of approximately twenty-seven and a half degrees, which is an angular rotation of about five degrees more than is necessary to disengage the plug and screw box threads. This additional rotation of the plug serves to afford clearance between the right hand ends of the stepped rows of threads on the plug and the left hand ends of the correspondingly stepped rows of threads on the screw box 1 so that the breech plug may swing outwardly without the necessity of providing clearance cuts except at the back ends $1^a$ and $2^c$ of the highest steps on the screw box and breech plug, respectively. The additional axial rotation which the breech plug 2 is permitted to have over and above that required to disengage its threads from those of the screw box 1 also permits the employment of cam devices by means of which the momentum of the plug and carrier, as they swing around the hinge pin 5, may be utilized to prevent the slamming of the plug, thus eliminating the possibility of it rebounding from the screw box as the breech is closed. To this end the breech plug 2 is provided with a cam roller $2^d$ which is journaled upon a headed pin $2^e$ that, as shown in Fig. 1, may be conveniently maintained in an appropriate socket in the plug by means of a screw $2^f$, while the screw box liner 1 is formed with an adjacent coöperating cam surface 1ᵇ the pitch of which, as more particularly shown in Fig. 13, is such that at the end of the swinging movement of the breech mechanism on the hinge pin 5 the motion of the breech plug 2 is converted from a simple swinging movement on the hinge pin into an advancing axial rotation corresponding to the pitch of the threads upon the breech plug and screw box, the plug 2 at the end of the coöperation of the cam face 1ᵇ and cam roller 2ᵈ being thus accurately delivered to the extended threads 1ᶜ at the forward end of the screw box which guide or lead the plug threads so that they properly engage those of the screw box 1. Similarly, when the operating lever 7 is actuated to rotate the breech plug 2 upon its axis for the purpose of disengaging its threads from those on the screw box 1, the momentum of the plug, acting through the cam surface 1ᵇ and coöperating cam roller 2ᵈ, is utilized to force the breech mechanism away from the screw box 1 and to initiate its swinging movement on the hinge pin 5, it being thus possible to rapidly actuate the operating lever 7 without danger of it being suddenly arrested.

In order to prevent the plug 2 from rotating while open and to maintain it in a position which will permit it to properly enter the screw box 1 when swinging to closed position, as well as for the purpose of enabling the operator to control the plug in case it starts to swing accidentally when the ship is rolling heavily, it is preferred, in case of very large guns, to employ a horizontally extending control arc 6 the center of curvature of which corresponds to the axis of the hinge pin 5, said control arc being preferably secured to the screw box liner 1 by means of screws 6ᵃ and its upper surface being adapted, upon a slight rotation of the breech plug 2 upon its axis, to engage the surface 2ᵍ between two steps of the plug threads to thus operate as a friction brake which may be called into action at the will of the operator by simply rotating the operating lever 7 through a small angle, as will be readily understood. When a control arc or brake member such as 6 is employed, the breech plug 2 is also preferably formed with an inclined shoulder 2ʰ against which the outer end 6ᵇ of the control arc is adapted to abut when the operating lever 7 is lifted slightly after the breech plug has been swung to fully open position, the plug being thus latched against swinging to closed position until the operating lever is subsequently lowered. The inner end 6ᶜ of the control arc acts as the inverse side of the cam surface 1ᵇ shown in Fig. 13, operating in conjunction with the outer end of the surface 2ᵍ of the plug and the adjacent portion of the outer face of the plug thread 2ʲ.

The rotation of the breech plug 2 upon its axis and the swinging of the entire breech mechanism on the hinge pin 5 are both effected through the instrumentality of a single operating lever 7 which is pivotally mounted upon the carrier at the side thereof and between the hinge lugs 3ᵃ. This operating lever is rigidly connected to a plug actuating crank shaft 8 which is journaled on the carrier 3, the inner journal bearing 3ᵈ of the shaft being preferably detachable and connected to the carrier by means of threaded bolts 3ᵉ which connect the operator bar bearing 25 to the carrier, and the outer journal bearing, 3ᶠ, being formed in the carrier. The cylindrical crank pin 8ᵃ at the inner end of the crank shaft 8 enters a corresponding recess in a cylindrical crosshead 9 which is slidably and rotatably mounted in an appropriate cylindrical guiding recess 10ᵃ formed in a crosshead bearing member 10 that is rigidly secured to the breech plug 2 by means of a threaded bolt 10ᵇ and lock screws 10ᶜ, the said bearing member 10 being also preferably provided with an inwardly projecting lug or flange 10ᵈ which fits into a corresponding recess formed in the face of the breech plug 2 to thus maintain the bearing member 10 in proper position and at the same time relieve its securing bolts 10ᵇ and 10ᶜ of strain. The crosshead guiding recess 10ᵃ is made of sufficient length to permit the crank shaft 8 to be rotated through the required angle in either direction from the dead center position, which is the position illustrated in Fig. 11, the mechanism being thus capable of use in either right or left handed mounts, for, as will be readily understood, a rotation of the crank shaft 8 in either direction will cause the slidable crosshead 9 and crosshead bearing 10 to always rotate the breech plug 2 in an unlocking direction. It may be here noted that the crank shaft 8, by reason of it being on dead center when the breech mechanism is fully closed, locks the breech plug 2 against an accidental unlocking rotation, and it will be also noted that as the crank shaft is at its dead center position when the gun is fired, but little effort is required to loosen the gas check pad after firing, for a very small force applied to the operating lever 7 will produce an enormously increased force acting through the crank shaft 8, crosshead 9 and crosshead bearing 10 to effect an unlocking rotation of the breech plug. The crosshead bearing member 10 is also provided with an outwardly projecting detent 10ᵉ having an inclined or beveled face 10ᶠ, such detent serving to control the operation of the magazine wedge, as will hereinafter appear, to thereby prevent the possibility of closing the firing mechanism and exploding the primer before the breech plug 2 has been rotated to its locked position, and the inclined face serving to cause the magazine wedge to be withdrawn to a safe position as the breech plug 2 rotates to its unlocked position in case any part of the firing mechanism is broken or for any other cause fails to act.

The operating lever 7 is preferably rigidly connected to the plug operating crank shaft 8 in the following manner. The lever cam 11 by which the firing mechanism is normally operated is provided with a hollow cylindrical sleeve 11$^a$ which is journaled in the bearing 3$^f$ of the carrier and which receives the outer end of the crank shaft 8, the latter being secured thereto by means of keys 11$^b$ and a bolt 11$^c$ which passes through the center of the lever cam and has threaded engagement with the shaft. The outer face of the lever cam is provided with a threaded boss 11$^d$ which engages the correspondingly threaded portion 7$^a$ of the operating lever 7, keys 7$^b$ being employed for the purpose of preventing the lever from unscrewing.

In order to arrest the unlocking rotation of the breech plug 2 when it has turned upon its axis through the required angle, the lever cam 11 is preferably provided with stops or projections 11$^e$ which are adapted to engage corresponding stops or abutments 3$^g$ with which the hinged carrier 3 is provided, the stops 11$^e$ and 3$^g$ being arranged to coöperate in pairs, one pair being operative when the mechanism is assembled for a right handed mount and the other pair being similarly adapted to engage when the mechanism is assembled for a left handed mount; and in order to limit the locking rotation of the plug upon its axis, the operating lever 7 may be conveniently arranged to come into contact and be arrested by a fixed portion of the gun after having rotated the crank shaft 8 through the necessary angle, the operating lever 7 being for this purpose preferably fashioned with a projecting stop 7$^c$ which is adapted to engage the rear face of the gun yoke 12, as more particularly shown in Fig. 5.

As the control arc 6, which, as heretofore described, serves to prevent the breech plug 2 from rotating while swinging to open position, is ordinarily used only on very large guns where it is desirable to prevent the plug from swinging too rapidly and also to latch it in open position so as to prevent it from swinging inwardly when the ship rolls, it is preferred to form the operating lever 7 with an arm or extension 7$^d$ that, when the breech mechanism is swung upon the hinge pin 5, is adapted to pass between arc shaped parallel safety jaws or stops 13 that are preferably formed as an integral bracket which is secured to the gun yoke 12 between the hinge lugs 4 by means of screws 13$^a$. As will be seen upon reference to Figs. 5, 35 and 37, before the breech mechanism can be swung to open position on the hinge pin 5 the operating lever 7 by which the rotation of the breech plug 2 is effected must be turned through an angle sufficient to cause the outer end of its extension 7$^d$ to assume a position which will permit it to pass above the upper surface of the proximate safety jaw 13. When, as shown in Fig. 35, the operating lever 7 has been turned to completely unlock the breech plug 2, the breech mechanism may be swung upon the hinge pin 5 by pulling outwardly upon the operating lever, the outer end of the extension 7$^d$ of the latter passing above the lower safety jaw 13 and thus preventing the operator from rotating the plug upon its axis toward locked position until after the carrier has been properly swung around the hinge pin 5 toward closed position. When a control arc 6 is employed in conjunction with the safety jaws 13 and the extension 7$^d$ of the operating lever, the inner ends of the safety jaws are somewhat depressed or hollowed out, as at 13$^b$, in order to permit the operating lever 7 to rotate slightly after its extension 7$^d$ has passed between the safety jaws, thus permitting the breech plug 2 to be forced into frictional engagement with the control arc 6 and to latch the plug in open position, as heretofore described. As the mechanism is assembled in the drawings the lower safety jaw 13 coöperates with the extension 7$^d$ of the operating lever; but the upper safety jaw 13 similarly coöperates with the extension of the operating lever when the mechanism is assembled as a left handed mount. For small guns it is preferred to omit the control arc 6 and to employ the safety jaws 13 alone, as the latter are more accessible, simple in construction, and necessitate no cuts either in the plug 2 or screw box 1.

The mushroom 14, which is provided with the usual form of head 14$^a$ for maintaining the gas check pad 15 in proper position with respect to the inner face of the breech plug 2, is mounted upon the carrier 3 so as to be capable of sliding but incapable of rotating with respect thereto, the mushroom stem 14$^b$, which is received by the hollow spindle 3$^b$ of the carrier, being for this purpose connected to said spindle by means of a key 14$^c$ that enters a longitudinally extending keyway in the mushroom stem. The rear end of the mushroom stem is formed with the usual primer seat 14$^d$ (see Figs. 6, 24 and 28) and with the well known flash passage 14$^e$ which extends through the mushroom stem and head and permits the fire from the primer to pass into the ammunition chamber of the gun. In order that the mushroom head 14$^a$ may compress the gas check pad 15 the requisite amount, the bore in the outer end of the spindle 3$^b$ of the carrier is enlarged to form a chamber which receives a spring 14$^f$ that encircles the mushroom stem and is maintained thereon by means of a nut 14$^g$ of the usual design, a hardened steel washer 14$^h$ being interposed between the inner end of the spring and the spindle 3$^b$.

The receiver member 16 of the firing mechanism is detachably mounted upon the mushroom 14, the stem 14$^b$ of the latter being preferably provided with interrupted annular collars 14$^j$ which are adapted to fit into corresponding arc shaped grooves between similar interrupted collars 16$^a$ formed on the interior of the boss or thimble 16$^b$ of the receiver, the interrupted collars 14$^j$ and 16$^a$ being of such length that by rotating the receiver 16 on the mushroom stem 14$^b$ through an angle of ninety degrees the collars will be disengaged and the receiver may be detached from the mushroom stem. When in operative position the receiver 16 is maintained against accidental rotation by being interposed between a fixed stop and a movable stop, the former, 3$^h$, being rigidly connected to and projecting outwardly from the face of the carrier 3, and the latter, 3$^j$, being preferably formed as a pin or button which is socketed in the carrier 3 and normally maintained in projected position by means of a small spiral spring 3$^k$.

The inner face of the receiver 16 is formed with a recess 16$^c$ which is adapted to receive and permit the oscillation of an extractor 17 by means of which the primers are extracted from the primer seat of the mushroom stem 14$^b$. The end of the extractor 17 which is adjacent to the mushroom stem is bifurcated to form parallel fingers 17$^a$ which, as more particularly shown in Fig. 24, are adapted to fit into a slot or recess formed in the outer end of the mushroom stem and to extend upon opposite sides of and form a movable base for the primer seat 14$^d$ therein. The opposite end of the extractor is provided with outwardly projecting curved cam fingers 17$^b$ which are adapted to extend into corresponding grooves or cam slots 18$^a$ formed in the sliding wedge 18 of the lock mechanism. Intermediate of its ends the extractor 17 is fashioned with oppositely extending pintles 17$^c$ which are adapted to oscillate in elongated bearings 16$^d$ of the receiver 16, such bearings being conveniently formed, as shown, by drilling through the receiver from top to bottom a hole 16$^e$ of elongated or oblong cross-section. In the operation of opening the breech mechanism, when the wedge 18, which is slidably mounted upon the receiver, has been withdrawn sufficiently far to bring the shallowing bottoms at the inner ends of its cam grooves 18$^a$ opposite the outer ends of the cam fingers 17$^b$, the curved faces of the latter roll upon the adjacent flat face of the receiver recess 16$^c$ and the extractor 17 is rotated or rocked outwardly to the position shown in dotted lines in Fig. 6, thus operating to extract the primer.

The upper and lower walls of the receiver between which the wedge 18 reciprocates are provided on their inner faces with oppositely extending flanges 16$^f$ which serve to maintain the wedge in operative position with respect to the receiver and to guide it during its movement with respect to the latter. The upper and lower faces of the receiver are also provided with symmetrically disposed cam slots 16$^g$, one of which, as will hereinafter appear, is designed to control the operation of the combined magazine bottom and hammer latch when the mechanism is assembled for a right handed mount and the other of which is designed to similarly control such device when the mechanism is assembled for a left handed mount.

In order to permit the wedge 18 upon which the magazine is mounted to remain stationary and in proper position while the hammer 20 is feeding a primer, as well as for the purpose, as will hereinafter appear, of throwing the devices out of operation so as to prevent breaking of any parts should the primer become jammed, the rear ends of the upper and lower faces of the receiver 16 are formed with curved stops or abutments 16$^h$ which are adapted to engage correspondingly curved stops 20$^a$ formed on the hammer and thereby prevent inward movement of the wedge 18 until after the hammer stops 20$^a$ have moved out of engagement with the abutments 16$^h$ at the completion of the rotary movement by which the hammer 20 feeds the primer from the magazine to the primer seat 14$^d$ of the mushroom stem 14$^b$. The outer faces of the upper and lower walls of the receiver are also preferably provided with vertically extending recesses 16$^j$ which are adapted to receive correspondingly formed lugs 20$^b$ with which the hammer 20 may be provided, said lugs 20$^b$ being designed to bear against and slide upon the outer vertical faces 16$^k$ of the cheeks of the receiver as the mechanism is closed, thus preventing full contact of the point of the firing pin 21 with the primer until the wedge 18 has traveled to its closed position, at which time the hammer supporting lugs 20$^b$ register with the recesses 16$^j$ of the receiver. As more particularly shown in Figs. 6 and 22 the recess 16$^j$ of the receiver and the corresponding lugs 20$^b$ of the hammer are preferably formed with mating inclined faces which co-act upon the opening of the breech to lift the firing pin 21 and thus prevent it dragging across the primer.

In order to rotate the hammer 20 outwardly when the wedge 18 is withdrawn, the receiver 16 is provided with a vertically extending cam lug or abutment the inner face and rear corner 16¹ whereof are adapted to arrest the cam finger 20ᶜ of the hammer and cause the hammer 20 to rotate upon the pin 20ᵈ until it is turned to a position where the end of the cam finger slides over and is supported by the vertical face 16ᵐ of the receiver lug, the hammer 20 being thus retained in the raised position shown in dotted lines in Fig. 6. To provide clearance for the hammer stops 20ᵃ sufficient to permit the hammer 20 to be raised against the action of the main spring 29 when the primer is to be fired by percussion, and also to provide means whereby the hammer, if in raised position when the wedge is withdrawn, shall be lowered, as well as for the purpose of controlling the raising of the hammer so that it cannot be fully raised to the position shown in dotted lines in Fig. 4 until the wedge 18 has reached a position where, as shown in full lines in Fig. 6, the firing pin aperture 18ᵈ thereof is in proper alinement with the primer to permit the firing pin 21 to explode the same, all as will presently appear, the upper and lower walls or cheeks of the receiver 16 are formed with parallel slots 16ⁿ affording inclined faces 16ᵖ that are adapted to engage the correspondingly inclined outer faces of the hammer stops 20ᵃ to limit the rotation of the hammer 20 upon its pivot pin 20ᵈ. By thus limiting the rotation of the hammer 20 the movement of the primer feeding prong 20ᵉ thereof is also controlled and the latter is prevented from withdrawing from the magazine 19 sufficiently far to allow a fresh primer to fall into a position where it may be fed to the primer seat until the wedge 18 has actuated the extractor 17 to cause the previously fed primer to be extracted.

The movement of the wedge 18 toward firing position is limited by the engagement of the stop face or shoulder 16ⁱ of the receiver with the corresponding stop shoulder or lug 8ᵇ of the wedge, as will be readily understood.

The wedge 18, which is provided with outwardly projecting perforated lugs 18ᶜ between which the hammer 20 is pivotally mounted by means of the pin 20ᵈ, is formed with a recess or aperture 18ᵈ that is adapted to receive the firing pin 21 and permit it to contact the end of the primer 22 when the wedge has traveled to its closed position, as more particularly shown in Fig. 6. Near its inner end the wedge is formed with a sloping or inclined face 18ᵉ which, if the primer 22 be not fully entered in the primer seat 14ᵈ of the mushroom stem, serves, near the end of the locking movement of the wedge 18, to engage the end of the primer and force it inwardly to proper position.

For the purpose of permitting the wedge to be positively withdrawn by the operator bar 23 when the breech mechanism is moved to open position, the wedge is preferably formed with an extension having an upwardly projecting lug 18ᶠ which enters a correspondingly formed recess 23ᵃ with which the operator bar is provided at its inner end. The extension of the wedge 18 is also preferably fashioned with an inwardly projecting lug having an inclined face 18ᵍ which is adapted to be engaged by the correspondingly inclined face 10ᶠ of the detent carried by the crosshead bearing 10. Until the breech plug 2 has rotated toward locked position sufficiently far to permit the lug last mentioned to escape from the detent 10ᵉ of the crosshead bearing, the wedge 18 is prevented from moving to a position in which the firing pin 21 can explode the primer. In case any part of the firing mechanism should be broken or from any cause should fail to act when the operating lever 7 is manipulated to open the breech, the inclined face 10ᶠ at the end of the detent 10ᵉ engages the correspondingly inclined face 18ᵍ of the wedge and causes the latter to be withdrawn to a safe position in which the firing pin 21 is clear of the primer.

The magazine 19, which is preferably symmetrical above and below the primer guide recess 19ᵃ through which the primers 22 pass to the primer seat 14ᵈ in the mushroom stem, is mounted upon the wedge 18, being preferably integrally united thereto. In order to permit the feeding prong 20ᵉ of the hammer 20 to move inwardly and force a primer from the magazine into the primer seat, the magazine is open at its front end, as at 19ᵇ and its side adjacent to the feeding finger of the hammer is slotted horizontally, as at 19ᶜ. The horizontally slotted side of the magazine 19 is also preferably formed with a vertically extending slot 19ᵈ which enables the operator to insert his finger into the magazine and readily withdraw the primers therefrom whenever desired. The magazine bottom 19ᵉ, which also serves as a latch to prevent the feeding prong 20ᵉ of the hammer 20 from entering the magazine until the latter is in proper alinement with the primer seat 14ᵈ in the mushroom stem, as will hereafter appear, is pivotally mounted upon the body of the magazine by means of a pin 19ᶠ, which is adapted to be received by one or the other of the pivot pin openings 19ᵍ that are formed in the magazine body above and below the primer-guide recess 19ᵃ, the pivot pin 19ᶠ being designed to enter one of the pivot pin openings 19ᵍ when the magazine is assembled as a right handed mount and to enter the other pivot pin opening when the magazine is assembled as a left handed mount. Mounted upon the magazine bottom or hammer latch 19ᵉ is a spring 19ʰ the outer end of which, as shown in Figs. 29 and 30, bears upon the body portion of the magazine 19 to thus normally maintain the movable magazine bottom 19ᵉ in the elevated position illustrated in Fig. 29 by dotted lines, this position being that in which the feeding finger 20ᵉ of the hammer 20 is latched against executing a primer feeding movement. At its inner end the magazine bottom, which is preferably of bell crank form, is provided with a cam finger or stud 19ʲ that extends into the adjacent slot 16ᵍ of the receiver 16, each of said slots 16ᵍ being provided on its working side with an inclined face or shoulder 16ʳ which, when the wedge 18 and attached magazine 19 slide on the receiver 16 toward locking position, serves to act upon the cam stud 19ʲ and cause the magazine bottom 19ᵉ to rotate upon its pivot pin until it assumes the lowered position illustrated in Fig. 29 in full lines, the upturned outer end of the magazine bottom being thus withdrawn from the path of the feeding prong 20ᵉ of the hammer and the latter being permitted to perform its function of feeding one of the primers from the magazine. The sloping faces or inclines 16ʳ are so located that the magazine bottom 19ᵉ is withdrawn from the path of the feeding prong of the hammer 20 at the instant the magazine is in proper position for permitting a primer to be forced therefrom to the primer seat 14ᵈ in the mushroom stem.

In order to prevent forward movement of the primers 22 until the proper time, the inner faces of the rear end of the magazine body are provided with oppositely disposed vertically extending guide grooves 19ᵏ which receive the nibs or flanges of the primers and prevent forward movement of the primers until they are in alinement with the opening 19ᵇ in the magazine. An arc shaped groove 19ˡ, corresponding to the curvature of the primer flange, is formed in the upper face of the hammer latch or magazine bottom 19ᵉ at the outer end thereof, such curved groove serving, when the hammer latch is in elevated position, to receive the lower portion of the flange of the primer 22 which is to be fed, thus preventing the primer from moving forward until the hammer latch of the magazine bottom 19ᵉ has been lowered to release the feeding prong 20ᵉ of the hammer, even though the primer be free from the guide grooves 19ᵏ and in alinement with the central opening 19ᵇ of the magazine. When the magazine bottom or hammer latch 19ᵉ moves downwardly, the primer released therefrom is prevented from falling by the spring 19ʰ which extends under said primer and supports the same. To prevent the possibility of primers being ejected from the magazine by the shock of gun fire, a spring 19ᵐ, which may be riveted to the body of the magazine 19 and which extends partially across the openings through which the primers are inserted in the magazine, is preferably employed; and for the purpose of securing accurate alinement of the primer with its seat in the mushroom stem so as to prevent it striking the rear face of the mushroom stem 14ᵇ, a resilient primer guide 19ⁿ is employed, said primer guide being formed with a plurality of spring fingers that are adapted to engage and guide the primer while at the same time permitting the larger flanged end thereof to pass therethrough, and the fingers being preferably integrally connected to a collar which is threaded so as to screw into the correspondingly threaded primer-guide recess 19ᵃ.

In addition to the features of construction heretofore described, the hammer 20, which is pivotally mounted upon the wedge 18, is provided with a feeding finger or prong 20ᵉ which is adapted to enter the magazine 19 and feed a primer therefrom and is also provided with a plurality of perforated pivot lugs 20ᶠ which are adapted to receive a pivot pin 20ᵍ that serves to connect the hammer 20 to the spring-actuated connecting bar 24. The pivot pin 20ᵍ may be conveniently retained in position by means of a spring key 20ʰ that is mounted in the lower end of the pin and extends under the lower pivot lug 20ᶠ. In order that the primer may be fired either electrically or by percussion, the firing pin 21, which, as shown, may be and preferably is of conical form, is preferably insulated from the hammer 20 by means of ebonite or hard rubber insulation 21ᵃ which surrounds the threaded stem 21ᵇ of the firing pin and extends under the flange 21ᶜ thereof. The firing pin is securely maintained upon the hammer 20 by means of a nut 21ᵈ which also serves as a connection or terminal for the usual electric firing wire 21ᵉ, the said nut being provided with perforated lugs which are adapted to receive a pin 21ᶠ by which the perforated terminal sleeve 21ᵍ of the firing wire is connected to the nut 21ᵈ.

The operator bar 23, which is connected to the wedge 18, and the connecting bar 24, which is pivotally connected to the hammer 20, are both actuated by the cam 11 when the latter is rotated through the instrumentality of the operating lever 7. As shown more particularly in Figs. 4, 8, 9, and 17 to 21, inclusive, the operator bar 23 is slidably mounted in groove or guideways 3ᵏ in the carrier 3 and corresponding recesses formed in the inner face of the operator bar bearing 25, the latter, as heretofore described, being secured to the carrier by means of the bolts 3ᵉ. Projecting inwardly from the inner face of the operator bar 23 is a pair of parallel lugs 23ᵇ which are provided with elongated slots that are adapted to receive and permit the longitudinal travel of a pin 26ᵃ by which the cam actuated operator 26 is connected at its inner end to the operator bar, the latter being formed with a suitable longitudinally extending slot or opening 23$^c$ that permits the passage of the inner end of the operator and allows the latter to have an independent forward movement.

The devices by which power is transmitted through the connecting bar 24 from the operator 26 to the hammer 20, wedge 18, and associated movable parts, are yielding in character and preferably consist of a guide rod 27, a sleeve 28, which is slidably mounted upon the guide rod, and a main spring 29 which encircles and bears upon said rod and sleeve. The guide rod 27 is preferably provided with a rounded lug or bearing 27$^a$ which is seated in correspondingly curved bearings 26$^b$ at the inner bifurcated end of the operator 26, an annular flange 27$^b$ being provided to afford a seat for the outer end of the spring 29. The guide rod is slotted longitudinally to receive a firing trigger rod 30 and its inner end is notched or cut away as at 27$^c$ to coöperate with a hydraulically operated firing piston, the operation of these parts being hereafter described in detail. The guide sleeve 28, upon which the inner end of the main spring 29 is seated, is provided with a perforated lug 28$^a$ that receives a pivot pin 24$^a$ which passes through a corresponding opening in the outer end of the connecting bar 24, to thereby connect the latter to the guide sleeve. Formed on the inner side of the guide sleeve and extending through the slot or opening 23$^c$ in the operator bar 23 is a projection 28$^b$ having vertically extending lugs 28$^c$ which stand behind the inner face of the operator bar and serve to limit the extent of rocking movement of the guide rod 27, guide sleeve 28, and main spring 29 about the bearings 26$^b$ of the operator when the mechanism is operated by the hydraulically actuated firing devices. The inner end of the sleeve is also provided with an abutment 28$^d$ which coöperates with the outer end or cocking toe 33$^d$ of the hydraulically operating firing piston, as will be presently described.

The operator 26 upon which the spring-pressed guide-rod 27 bears and to which the operator bar 23 is attached by a pin and slot connection, as already described, is provided at its outer end with an inwardly extending cam finger or operator stud 26$^c$ which, in the normal operation of the breech mechanism projects through the slot 23$^d$ in the adjacent end of the operator bar 23 and extends into the cam slot formed in the outer face of the cam 11. Adjacent to the operator stud 26$^c$ the operator is formed with an inclined or sloping face 26$^f$ which, as will be understood upon reference to Fig. 8, is adapted to slide over and in contact with the edge 23$^e$ of the operator bar 23 at the base of the stud receiving slot 23$^d$ therein. When, during the locking of the breech, the movement of the operator bar is arrested, either by the jamming of a primer or through any other cause, the continued inward movement of the operator induced by the passage of the operator stud 26$^c$ through the inclined portion 11$^f$ of the groove in the operating cam 11 causes the inclined face 26$^f$ of the operator to travel over the edge 23$^e$ of the operator bar, thus raising the operator stud 26$^c$ out of the cam groove and preventing the possibility of breaking any part of the mechanism.

In order that the cam 11 may be employed for both right and left handed mounts, its upper and lower halves are made symmetrical, the cam slot therein being formed with reversely arranged, connected, corresponding inclined portions 11$^f$, succeeding straight or dwell portions 11$^g$, inclined portions 11$^h$, and outer straight or dwell portions 11$^j$.

To enable the operator to quickly extract a defective primer and re-prime while standing out of the path of recoil of the gun, an operator handle 31 is pivotally mounted upon the operator 26 by means of a pivot pin 31$^a$. This operator handle is provided with a vertically extending bar 31$^b$ which may be easily gripped by the fingers and also with a roughened or knurled plate 31$^c$ which forms a rest for the palm of the hand of the operator. The outer end of the operator handle is slotted, as more particularly shown at 31$^d$ in Fig. 9, and its inner faces 31$^e$, as shown in Fig. 8, normally contact the outer face of the operator bar 23 adjacent to the stud receiving slot 23$^d$ in the latter. At its outer end the operator handle is also provided with inwardly extending projections or lugs 31$^f$ between which the operator bar 23 is adapted to slide when the operator handle 31 is rotated and the said lugs 31$^f$ engage and fulcrum upon the rounded portions 3$^j$ of the carrier 3 in which the operator bar is slidably mounted. By pulling upon the bar 31$^b$ the operator handle is caused to rotate upon the pin 31$^a$ by which it is connected to the operator 26, the stud 26$^c$ of the latter being thereby lifted out of the groove in the operating cam 11 through the lever action effected by the outer ends of the surfaces 31$^e$ acting against the adjacent faces of the operator bar 23. The pivotal movement of the operator 26 around the pin 26$^a$ by which it is connected to the operator bar 23 is limited to an amount sufficient to permit the stud 26$^c$ to be lifted out of the groove of the cam 11 by means of an upwardly extending limit lug 26$^d$ that is formed on the operator 26 and is adapted to be engaged and arrested by the outer face of the operator bar 23. When the operator stud 26$^c$ has been lifted from the cam slot the inwardly extending lugs 31$^f$ of the operator handle come into engagemnt with the surfaces 3$^l$ of the carrier, which thus forms a fulcrum permitting the operator handle 31 to act as a lever when starting the operator 26 outward toward the position shown in dotted lines in Fig. 8. A continuous pull upon the operator handle serves to cause the parts to assume the position indicated by dotted lines in Fig. 8, such position corresponding to the open position of parts indicated in dotted lines in Fig. 6. By this operation the primer is extracted from the primer seat 14$^d$ of the mushroom stem and a new primer is permitted to descend in the magazine in front of the feeding prong 20$^e$ of the hammer 20. By pushing inwardly with the palm of the hand against the knurled surface of the plate 31$^e$ of the operator handle, the operator bar 23 is caused to slide inwardly to locked position and the operator stud 26$^c$ of the operator 26 is returned to the groove in the operating cam 11, as shown in Figs. 8 and 9. This inward movement of the operator bar 23 and operator 26 causes the wedge 18 and associated parts to move to locked position as illustrated in Figs. 6 and 7, thus feeding a primer into the primer seat of the mushroom stem and bringing the firing pin 21 into proper position for exploding the primer.

To permit firing by percussion from a position at the breech of the gun a firing trigger 32 is preferably employed. This trigger, which is mounted on the pivot pin 26$^a$ and extends between the jaws 26$^e$ at the inner end of the operator 26, is provided near its outer end with a finger recess 32$^a$ and is slotted or bifurcated at its inner end to receive the firing trigger rod 30 and form a shoulder 32$^b$ which is adapted to engage the outturned end or projection 30$^a$ of the trigger rod, to thus enable the operator to actuate the trigger rod and cause the outwardly projecting lug 30$^b$ at the inner end thereof to move into engagement with the guide sleeve 28 and force the latter outwardly along the spring guide rod 27, thus also moving the connecting bar 24 outwardly and compressing the main spring 29. When the connecting bar 24 is thus actuated the hammer 20 is brought to the raised position shown in dotted lines in Fig. 4, and when the operator thereafter releases the trigger 32 the main spring 29 expands and causes the point of the firing pin 21 to strike and explode the primer.

In order to be able to fire by percussion from a distant point the following construction is preferably employed. The operator bar bearing 25 is formed with a cylindrical chamber 25$^a$ in which is slidably mounted a firing piston 33 that is provided at its inner end with a packing disk 33$^a$ which may be conveniently secured to the piston by means of a screw 33$^b$. The piston is slotted longitudinally, as at 33$^c$, to receive a transversely extending screw 25$^b$ that is mounted in the operator bar bearing 25 and serves to limit the extent of movement of the piston. Communicating with the rear end of the piston chamber is a vertical passage 25$^c$ to one end of which is connected a flexible hose 34 through which hydraulic pressure may be transmitted to the liquid in the cylinder behind the firing piston 33, the other end of the passage 25$^c$ being closed by a cap 25$^d$ which is provided with a screw plug 25$^e$ whereby any air which may accumulate in the upper portion of the passage 25$^c$ may be permitted to escape. The outer end of the firing piston is provided with a cocking toe 33$^d$ which, when the piston is forced outwardly by hydraulic pressure communicated through the hose 34, is adapted to engage the corresponding abutment 28$^d$ of the guide sleeve 28, to thus actuate the connecting bar 24 and compress the main spring 29. The outer end of the piston 33 is also formed with an inclined face 33$^e$ which, as shown in Fig. 17, by engaging the inner end of the spring guide-rod 27 as the guide sleeve 28 is forced outwardly by the piston, serves to move the guide sleeve 28 sidewise, thereby releasing it from the cocking toe 33$^d$ of the piston and permitting the main spring 29 to suddenly expand and actuate the connecting bar 24 to rotate the hammer 21 from the position shown in dotted lines in Fig. 4 to the position shown in full lines in said figure, thus causing the firing pin 21 to strike the cap of the primer and explode it by percussion. Upon re-priming, either by turning the operating lever 7 to unlock the breech or by actuating the operator handle 31$^b$, the spring guide-rod 27, spring 29 and guide sleeve 28 are returned to normal position with the abutment 28$^d$ of the latter in alinement with the cocking toe 33$^d$ of the firing piston.

The construction of the breech mechanism being substantially such as hereinbefore pointed out, the operation will be as follows: In unlocking the breech, when the operator rotates the operating lever 7 the stud 26$^c$ of the operator 26 is caused to travel in the cam slot or groove of the operating cam or lever cam 11. During the travel of the stud 26$^c$ in the inclined portion 11$^f$ of the groove the operator 26, acting through the pivot pin 26$^a$, withdraws the operator bar 23 and connected wedge 18, carrying the firing pin 21 out of engagement with the primer and bringing the magazine 19 into alinement therewith. As the operator stud travels through the dwell or straight portion 11$^g$ of the operating cam the operator bar 23, connecting bar 24, wedge 18, magazine 19 and hammer 20 and associated parts remain stationary. During the movement of the operator stud through the inclined portion 11ʰ of the cam groove, the operator 26, operator bar 23, wedge 18 and magazine 19 are further withdrawn and assume the positions illustrated in dotted lines in Fig. 6 and in full lines in Fig. 3, the hammer 20, during this period of movement of the wedge 18, being rotated on the pin 20ᵈ to raised position and the connecting bar 24 being forced rearwardly to move the guide sleeve 28 and thus compress the main spring 29, such rotation or lifting of the hammer being effected by the coöperation of the cam finger 20ᶜ of the hammer and the inner face and lower corner 16ˡ of the receiver 16, as heretofore explained. During the period of rotation of the operating lever 7 corresponding to the travel of the operator stud 26ᶜ in the straight or dwell portion 11ʲ of the operating cam 11, the firing lock members remain at rest but the crank shaft 8 by which the breech plug 2 is rotated continues to revolve to thus complete the unlocking rotation of the breech plug, which, it will be noted, is not completely effected until after the firing lock mechanism is in open or unlocked position. When the unlocking rotation of the breech plug 2 is completed, the operator may swing the breech to open position, as illustrated in Fig. 3, by pulling outwardly upon the operating lever 7 so as to swing the carrier on its pivot pin 5.

When the breech is open, as shown in Fig. 3, it may be closed by first pressing upon the operating lever 7 so as to rotate the carrier upon the hinge pin 5 until the cam roller 2ᵈ of the breech plug engages the cam face 1ᵇ on the screw box liner. By continuing the rotary movement of the operating lever 7 initiated by the cam roller and cam face, 2ᵈ and 1ᵇ, respectively, the crank shaft 8, acting through the crosshead 9 and crosshead bearing 10, causes the breech plug 2 to execute a locking rotation while the stud 26ᶜ of the operator travels in the straight or dwell portion 11ʲ of the operating cam 11, the firing lock mechanism thus remaining at rest during this interval of rotation of the operating lever 7 and breech plug 2. As the operator stud 26ᶜ travels inwardly in the inclined portion 11ʰ of the groove of the operating cam, the operator 26 is forced inwardly and acts through the guide rod 27, main spring 29 bearing thereon and the guide sleeve 28 to which the connecting bar 24 is attached to force the latter inwardly, thus moving the hammer 20 and wedge 18 and associated parts to the position shown in Fig. 28, in which the hammer is raised and the magazine 19 is in proper position to permit a primer to be forced from the magazine into the primer seat 14ᵈ of the mushroom stem. At this instant the cam finger 19ʲ of the combined magazine bottom and hammer latch 19ᵉ engages the adjacent inclined face 16ʳ of the slot 16ᵍ of the receiver, and the magazine bottom is lowered to release a primer and unlatch the hammer 20, permitting the latter to perform a primer feeding rotation around the pivot pin 20ᵈ by which it is connected to the wedge 18. This primer feeding rotation of the hammer is effected by the expansion of the main spring 19, which actuates the connecting bar 24 while the operator stud 26ᶜ is traveling in the straight or dwell portion 11ᵍ of the operating cam 11, the wedge 18 being thus permitted to remain stationary until the primer feeding rotation of the hammer 20 is completed and the stop lugs 20ᵃ upon the hammer have passed out of engagement with the corresponding abutments 16ʰ of the receiver 16. At the end of the primer feeding movement of the hammer 20 the locking rotation of the breech plug 2 is substantially complete. As the operator stud 26ᶜ of the operator passes through the inclined portion 11ᶠ of the groove in the operating cam 11 the connecting bar 24, acting through the hammer 20, moves the wedge 18 to the position shown in Figs. 6 and 7 where the firing pin aperture 18ᵈ of the wedge is in alinement with the cap of the primer, the detent 10ᵉ on the crosshead bearing 10 having at this time been rotated to a position permitting the final inward movement of the wedge and the lugs 20ᵇ upon the hammer having entered the recesses 16ʲ in the receiver to permit the point of the firing pin 21 to contact the primer. If by reason of the jamming of a primer or from any other cause the hammer 20 should fail to fall at the proper time during the operation of closing the breech, the engagement of the hammer stops 20ᵃ with the correspondingly curved abutments 16ʰ of the receiver prevents the wedge 18 from moving inwardly to final position, the operator bar 23, which is connected to the wedge, being thus also arrested and the operator stud 26ᶜ of the operator 26 being lifted out of the groove in the operating cam 11 in the manner heretofore explained, damage to any part of the mechanism being thereby prevented.

The manner of assembling the mechanism heretofore described for use as a left handed mount, instead of as a right handed mount as shown in the drawings will be readily understood. Assume the gun and breech mechanism to be rotated through one hundred and eighty degrees. Remove the keys 7ᵇ which prevent the operating lever 7 from rotating with respect to the operating cam 11 and unscrew the operating lever from the operating cam. Turn the operating lever over, screw it on the operating cam 11 and replace the keys 7ᵇ, thus again bringing the operating lever 7 to a position in which it points upwardly toward the muzzle of the gun. Next withdraw the pivot pin 19[f] by which the combined magazine bottom and hammer latch 19[e] is pivotally connected to the magazine and reassemble these parts so that the magazine bottom is mounted on what has become the lower half of the magazine 19, the portion of the magazine extending below the movable magazine bottom, as shown in Fig. 9, thus becoming the upper half of the magazine and receiving the primers. The firing wire 21[e] and the flexible hose 34 through which firing by percussion is effected by hydraulic pressure are also rigged to the other hand, as will be readily understood. When thus converted to a left handed mount the mechanism operates in precisely the same manner as heretofore described, the groove in the lower half of the operating cam 11 serving to coöperate with the operator stud 26[e] and control the movements of the firing lock mechanism.

In case it is desired to operate the breech mechanism when the gun is arranged at some fixed angle, z, of elevation, it is preferred to rotate the gun in its sleeve so as to raise the lever side of the mechanism until the hinge pin 5 of the carrier makes the angle z with a plane perpendicular to the gun trunnions. When so raised, the breech plug 2, instead of swinging in a horizontal plane, will dip down and up again as it swings to open or closed position, and inasmuch as the arc through which the breech plug 2 and carrier 3 swing is only a little more than ninety degrees the position of the center of gravity of the mechanism will remain in substantially the same horizontal plane during the swinging of the carrier.

Having thus described our invention, what we claim and desire to secure by Letters Patent is:

1. In a breech mechanism for ordnance, the combination with a rotatable breech plug, of a crank shaft for rotating the same, said crank shaft being in dead center position when the breech plug is in locked position and being rotatable on an axis extending toward the axis of the gun.

2. In a breech mechanism for ordnance, the combination with a rotatable breech plug, of a crank shaft for rotating the same, said crank shaft being rotatable in one direction to cause an unlocking rotation of the breech plug when the mechanism is assembled for a right handed mount and being rotatable in the opposite direction to cause an unlocking rotation of the breech plug when the mechanism is assembled for a left handed mount.

3. In a breech mechanism for ordnance, the combination with a movable breech plug, of a crank shaft for actuating the same, said crank shaft being rotatable in one direction to cause an unlocking movement of the plug when the mechanism is assembled for a right handed mount and being rotatable in the opposite direction to cause an unlocking movement of the breech plug when the mechanism is assembled for a left handed mount.

4. In a breech mechanism for ordnance, the combination with a rotatable breech plug, of a crosshead slidably and rotatably mounted thereon, a crank shaft having a crank pin which engages said crosshead, and means for rotating said crank shaft.

5. In a breech mechanism for ordnance, the combination with a swinging carrier, of a breech plug movably mounted thereon, a crank shaft mounted on said carrier and adapted to actuate said breech plug, and a lever for rotating said crank shaft, said lever being rotatable in a plurality of planes and serving as means for swinging said carrier.

6. In a breech mechanism for ordnance, the combination with a swinging carrier, of a breech plug rotatably mounted thereon, a cross-head bearing secured to said breech plug, a crosshead slidably and rotatably mounted on said crosshead bearing, a crank shaft journaled on said carrier and having a crank pin engaging said crosshead, and a lever for rotating said crank shaft.

7. In a breech mechanism for ordnance, the combination with a swinging carrier, of a breech plug rotatably mounted thereon, means for swinging said carrier, and means operating during the swinging of the carrier for rotating said plug on its longitudinal axis.

8. In a breech mechanism for ordnance, the combination with a swinging carrier, of a breech plug rotatably mounted thereon, means for actuating said carrier, and devices operated by a movement of the carrier for rotating said breech plug on its longitudinal axis.

9. In a breech mechanism for ordnance, the combination with a swinging carrier, of a breech plug rotatably mounted thereon, means for swinging said carrier, means for rotating said breech plug with respect to said carrier, and means operated by a rotation of said breech plug for swinging said carrier in one direction, said last named means also operating during a swinging movement of the carrier in the opposite direction to rotate said breech plug with respect to the carrier.

10. In a breech mechanism for ordnance, the combination with a swinging carrier, of a breech plug rotatably mounted thereon, and cam devices for rotating said plug on its longitudinal axis as the carrier swings to closed position.

11. In a breech mechanism for ordnance, the combination with a movable carrier, of a breech plug rotatably mounted thereon, and coöperating cam devices on the plug and on a stationary part of the gun for rotating said plug on its longitudinal axis during a movement of the carrier.

12. In a breech mechanism for ordnance, the combination with a swinging carrier, of a breech plug rotatably mounted thereon, means for swinging said carrier, a cam face, and a cam roller adapted to engage said cam face to rotate said breech plug on its longitudinal axis during a swinging movement of the carrier.

13. In a breech mechanism for ordnance, the combination with a screw box having blanks and threaded steps, of a stepped threaded breech plug having corresponding blanks and threaded steps, and angles subtended by the threaded steps of the plug being less than the angles subtended by the corresponding blanks of the screw box, whereby the unlocking rotation of the plug may be continued after disengagement of the threads.

14. In a breech mechanism for ordnance, the combination with a screw box, of a stepped threaded breech plug having blanks which are wider than the threaded steps, a swinging carrier upon which the breech plug is rotatably mounted, and means for swinging said carrier during the rotation of the breech plug thereon.

15. In a breech mechanism for ordnance, the combination with a swinging carrier, of a breech plug rotatably mounted thereon, a control arc, and means for causing said control arc and plug to slidably engage each other and operate as a brake, said means being movable to control and vary the braking force at the will of the operator.

16. In a breech mechanism for ordnance, the combination with a movable carrier, of a breech plug rotatably mounted thereon, means for moving said carrier, brake devices for controlling the movement of said plug and carrier, and means for causing the operation of said brake devices during the movement of said carrier, said means for operating the brake devices being movable at the will of the operator to control and vary the braking force of said brake devices.

17. In a breech mechanism for ordnance, the combination with a swinging carrier, of a breech plug rotatably mounted thereon, a control arc secured to a stationary part of the gun, means for swinging said carrier, means for causing said plug to slidably engage said control arc during the swinging movement of the carrier, and means for rotating said plug to latch the carrier in open position.

18. In a breech mechanism for ordnance, the combination with a swinging carrier, of a breech plug rotatably mounted thereon, an operating lever rotatably mounted on the carrier, means actuated by the operating lever for rotating said breech plug with respect to said carrier, and means for preventing the rotation of the breech plug to locked position until the carrier has been swung toward closed position, said last named means comprising an arm rigidly attached to said lever and a stop member secured to a stationary portion of the gun and adapted to be engaged by said arm.

19. In a breech mechanism for ordnance, the combination with a breech plug, of a receiver attached thereto, a wedge slidably mounted on said receiver, a magazine mounted on said wedge, means rotatable with respect to said magazine and pivotally mounted on the wedge for feeding a primer from said magazine, means for actuating said wedge, and means for rotating said primer feeding means with respect to said wedge to thereby feed a primer from said magazine.

20. In a breech mechanism for ordnance, the combination with a breech plug, of a receiver connected thereto, a wedge slidably mounted on said receiver and having a firing pin receiving aperture therein, a magazine mounted on said wedge, a hammer movable with respect to said wedge and having a feeding prong adapted to feed a primer from the magazine and also having a firing pin adapted to enter the firing pin receiving aperture in said wedge, means for moving said wedge with respect to said receiver, and means for moving said hammer with respect to said wedge.

21. In a breech mechanism for ordnance, the combination with a breech plug, of a receiver connected thereto, a wedge slidably mounted on said receiver and having a firing pin receiving aperture, a magazine rigidly connected to said wedge, a hammer pivotally mounted on said wedge, said hammer having a firing pin and being provided with a feeding prong adapted to feed a primer from the magazine and being also provided with a cam finger which is movable into engagement with the receiver to thereby rotate said hammer in one direction, spring actuated means for rotating said hammer in the other direction, and means for moving said wedge.

22. In a breech mechanism for ordnance, the combination with a rotatable breech plug, of a receiver connected thereto, a wedge slidably mounted on said receiver and having a firing pin receiving aperture therein, a hammer movably mounted on said wedge and having a firing pin adapted to enter the aperture in the wedge to explode a primer, and a detent mounted on the breech plug and movable into the path of travel of the wedge to prevent the latter from moving into firing position until after a locking rotation of the breech plug.

23. In a breech mechanism for ordnance, the combination with a rotatable breech plug, of a receiver connected thereto, a wedge slidably mounted on said receiver and having a firing pin receiving aperture therein, a firing pin movably mounted on said wedge, means for moving said wedge, and supplemental means mounted on and movable with the breech plug for engaging the wedge and withdrawing it from firing position when said first named means fails to act.

24. In a breech mechanism for ordnance, the combination with a breech plug, of a receiver connected thereto, a wedge slidably mounted on said receiver, a hammer movably mounted on said wedge and having a firing pin, and means for moving said wedge, said receiver and hammer being provided with means adapted to lower the hammer when the wedge is withdrawn from firing position while the hammer is raised.

25. In a breech mechanism for ordnance, the combination with a breech plug, of a receiver connected thereto, a wedge slidably mounted on said receiver, a hammer pivotally mounted on said wedge, means for moving said wedge, means for rotating said hammer toward firing position, and means for preventing said wedge from moving to firing position until after said rotation of said hammer.

26. In a breech mechanism for ordnance, the combination with a breech plug, of a receiver connected thereto and provided with curved abutments, a wedge slidably mounted on said receiver, a hammer pivotally mounted on said wedge, means for rotating said hammer to firing position, means for arresting the rotation of said hammer before it reaches firing position, and means controlled by the movement of said wedge for permitting said hammer rotating means to complete the rotation of said hammer to firing position, said hammer having curved stops adapted to engage the curved abutments of the receiver to prevent inward movement of the wedge to firing position until the said curved stops and curved abutments have been disengaged by the rotation of said hammer.

27. In a breech mechanism for ordnance, the combination with a receiver, of a wedge slidably mounted thereon, a hammer pivotally mounted on said wedge and having a firing pin and a primer feeding prong, a magazine, means for rotating said hammer to feed a primer from the magazine while the wedge is at rest, means for moving said wedge to firing position after the primer feeding movement of said hammer, and means controlled by the movement of the wedge to firing position for rotating said hammer to firing position.

28. In a breech mechanism for ordnance, the combination with a magazine member, of a hammer movable with respect thereto and adapted to feed a primer therefrom, and means for latching said hammer against a primer feeding movement, said means being mounted on and movable with respect to said magazine member.

29. In a breech mechanism for ordnance, the combination with a magazine member, of a hammer movable with respect thereto and adapted to feed a primer therefrom, spring actuated means mounted on and movable with respect to said magazine member for latching said magazine hammer against a primer feeding movement, and means for moving said spring actuated means to release said hammer.

30. In a breech mechanism for ordnance, the combination with a horizontally slotted magazine, of a pivoted hammer having a primer feeding prong adapted to enter said magazine and feed a primer therefrom, said magazine having a movable bottom and a spring for actuating said movable bottom, said movable bottom being adapted to engage the feeding prong of said hammer to latch the same against a primer feeding movement and said spring serving to support a primer when the magazine bottom is moved to release the hammer.

31. In a breech mechanism for ordnance, the combination with a magazine, of a hammer which is adapted to feed a primer therefrom, said magazine having a horizontal slot to permit the operation of the hammer and having a vertical slot affording access to primers in the magazine, and said magazine being formed with a pivotally movable bottom which is adapted to engage said hammer and being also provided with a spring bearing upon said movable bottom.

32. In a breech mechanism for ordnance, the combination with a magazine having a body portion the upper and lower halves of which are similar in construction, of a hammer adapted to feed a primer from said magazine, said magazine having a movable bottom which may be assembled in different positions on the magazine body, whereby said hammer and magazine are adapted to coöperate when the breech mechanism is assembled either as a right handed or a left handed mount.

33. In a breech mechanism for ordnance, the combination with a magazine having a body portion and a movable bottom, of a hammer adapted to feed a primer from said magazine, the body portion of said magazine being provided with oppositely disposed guide slots adapted to receive the flange of a primer and the movable bottom of the magazine being formed with a groove adapted to receive the flange of a primer, and said magazine bottom being normally retained in engagement with said hammer by means of a spring which supports the primers when the flanges of the latter are free from the guide slots of the magazine and the flange receiving groove of the movable magazine bottom.

34. In a breech mechanism for ordnance, the combination with a breech plug, of a receiver connected thereto, a wedge slidably mounted on said receiver, a hammer movably mounted on said wedge and provided with a firing pin, a rotatable cam, an operator member actuated by said cam, a bar connected to said wedge and movably connected to said operator member, a bar connected to said hammer, and a spring interposed between said last named bar and said operator member.

35. In a breech mechanism for ordnance, the combination with a breech plug, of a receiver connected thereto, a wedge slidably mounted on said receiver, a hammer pivotally mounted on said wedge and having a firing pin, a rotatable cam, an operator member actuated by said cam, a bar connected to said wedge and operator member, said bar being positively movable by said operator member in one direction only, a bar connected to said hammer, and a spring compressible by said operator member for actuating said last named bar to rotate said hammer.

36. In a breech mechanism for ordnance, the combination with a breech plug, of a receiver connected thereto, a wedge slidably mounted on said receiver, a hammer movably mounted on said wedge, a rotatable cam, an operator member engaging said cam and actuated thereby, means interposed between said operator member and wedge for moving the latter to firing position, a bar connected to said wedge and movably connected to said operator member, and means whereby the said operator member and cam are disengaged by a relative movement of said bar and operator member.

37. In a breech mechanism for ordnance, the combination with a breech plug, of a receiver connected thereto, a wedge slidably mounted on said receiver, a hammer pivotally mounted on said wedge, a rotatable cam having a groove therein, an operator member having an inclined face and having a stud projecting into said groove, a bar connected to said wedge and movably connected to said operator member and means interposed between said operator member and hammer for rotating the latter and for moving said wedge in one direction, said inclined face on said operator member being adapted to engage and slide upon said bar to thereby lift said stud out of the groove in said cam.

38. In a breech mechanism for ordnance, the combination with a breech plug, of a receiver connected thereto, a wedge slidably mounted on said receiver, a hammer pivotally mounted on said wedge, a rotatable cam, an operator member actuated by said cam, an operator bar connected to said wedge and slidably connected to said operator member, a connecting bar attached to said hammer, a guide rod movably engaging said operator member, a guide sleeve slidably mounted on said guide rod and connected to said connecting bar, and a spring bearing upon said guide rod and sleeve.

39. In a breech mechanism for ordnance, the combination with a receiver, of a wedge slidably mounted thereon, a hammer movable with respect to said wedge, a rotatable cam, and means operated by said cam for actuating said wedge and hammer, said cam having symmetrically disposed similar cam faces whereby a rotation of the cam in either direction serves to operate said means for actuating said wedge and hammer.

40. In a breech mechanism for ordnance, the combination with a receiver, of a wedge slidably mounted thereon, a hammer movably mounted upon said wedge, a spring operating to move said hammer to firing position, and means for compressing said spring and raising said hammer, said means comprising a bar connected to said hammer, a guide sleeve connected to said bar and engaging one end of said spring, a guide rod slidable with respect to said sleeve and engaging the other end of said spring, a trigger rod adapted to engage and move said sleeve, and a firing trigger for actuating said trigger rod.

41. In a breech mechanism for ordnance, the combination with a receiver, of a wedge slidably mounted thereon, a hammer movably mounted on said wedge, a firing trigger, a spring located between said hammer and trigger for operating said hammer, and means for raising said hammer against the pressure of said spring, said means being interposed between and operatively connected to said hammer and trigger.

42. In a breech mechanism for ordnance, the combination with a receiver, of a wedge slidably mounted thereon, an extractor operated by said wedge, a magazine movable with said wedge, a hammer movable with respect to said wedge and adapted to feed a primer from said magazine, a cam, means operated by said cam for actuating said wedge and hammer, and supplemental means for actuating said cam operated means, said supplemental means being operative independent of said cam.

43. In a breech mechanism for ordnance, the combination with a receiver, of a wedge slidably mounted thereon, an extractor operated by said wedge, a magazine, a hammer movable with respect to said magazine and adapted to feed a primer therefrom, means comprising a plurality of relatively movable members for actuating said wedge and hammer, and supplemental means for independently actuating some of the members of said means first named to thereby operate the said extractor, wedge and hammer.

44. In a breech mechanism for ordnance, the combination with a receiver, of a wedge slidably mounted thereon, a magazine, a hammer movable with respect to said magazine and adapted to feed a primer therefrom, a cam, an operator member actuated by said cam, a bar connecting said wedge and operator member, yielding means operatively connecting said hammer and operator member, and means pivotally mounted on said operator member for disengaging the latter from said cam and for moving the operator member to actuate said wedge and hammer.

45. In a breech mechanism for ordnance, the combination with a receiver, of a wedge slidably mounted thereon, a hammer movable with respect to said receiver and wedge, a rotatable cam, an operator member actuated by said cam, means interposed between said operator member and wedge for moving the latter in one direction, means interposed between said hammer and operator member for moving said hammer with respect to said wedge, and a lever pivotally mounted on said operator member for operating the same, said lever being movable into engagement with a stationary part of the gun and being provided with a bar adapted to be gripped by the fingers and being also provided with a plate affording a rest for the palm of the hand.

46. In a breech mechanism for ordnance, the combination with a receiver, of a wedge movably mounted thereon, a hammer movable with respect to said wedge and provided with a firing pin, means for moving said wedge, spring actuated means for moving said hammer, and fluid pressure operated means for moving said hammer against the pressure of said spring actuated means.

47. In a breech mechanism for ordnance, the combination with a hammer having a firing pin, of spring actuated means for moving said hammer in one direction, and fluid pressure operated means for actuating said spring actuated means to move said hammer to cocked position.

48. In a breech mechanism for ordnance, the combination with a hammer having a firing pin, of spring actuated means ,for moving said hammer to firing position, and means for moving said hammer from firing position, said last named means including a chamber, a piston movable with respect to said firing pin and movably mounted in said chamber and means for introducing fluid into said chamber behind said piston.

49. In a breech mechanism for ordnance, the combination with a hammer having a firing pin, of means for cocking said hammer, said means including a chamber, a piston movable with respect to said firing pin and movably mounted in said chamber, means for limiting the stroke of said piston and a flexible hose for introducing fluid into said chamber behind said piston.

50. In a breech mechanism for ordnance, the combination with a breech plug which is rotatable upon its axis and is bodily movable with respect to the breech of a gun, of means for supporting said plug and permitting it to move toward and from the breech of the gun, and means whereby the rotation of the plug upon its axis through equal angles induces equal bodily movements of the plug during one portion of its rotation and induces unequal and successively increasing bodily movements of said plug during another portion of its rotation.

51. In a breech mechanism for ordnance, the combination with a movable carrier, of a breech plug movably mounted thereon, a lever, and means actuated by said lever and interposed between said lever and breech plug for moving the latter with respect to said carrier, said lever being movable in a plurality of planes and serving as means for moving said carrier and operating substantially wholly outside of the projected area of the breech of the gun.

In testimony whereof we affix our signatures, in the presence of two subscribing witnesses.

GEORGE L. SMITH.
DORSEY F. ASBURY.

Witnesses:
G. P. RITTER,
THOMAS DURANT.

---

Copies of this patent may be obtained for five cents each, by addressing the "Commissioner of Patents. Washington, D. C."